United States Patent
Lindsey et al.

(10) Patent No.: US 8,206,069 B1
(45) Date of Patent: Jun. 26, 2012

(54) ATV/MOTORCYCLE LOCKDOWN APPARATUS

(76) Inventors: Kelly D. Lindsey, Drayton Valley (CA); Glen M. Sawyer, Calgary (CA)

( * ) Notice: Subject to any disclaimer, the term of this patent is extended or adjusted under 35 U.S.C. 154(b) by 1380 days.

(21) Appl. No.: 11/438,102

(22) Filed: May 19, 2006

(51) Int. Cl.
*B60P 7/08* (2006.01)

(52) U.S. Cl. .............................................. 410/3; 410/7

(58) Field of Classification Search .................. 410/2, 3, 410/7, 23; 224/403, 534, 546, 549, 552, 224/554, 560, 568, 924; 248/499, 500, 503; 211/22
See application file for complete search history.

(56) References Cited

U.S. PATENT DOCUMENTS

| | | |
|---|---|---|
| 4,078,821 A | 3/1978 | Kitterman |
| 5,326,202 A | 7/1994 | Stubbs |
| 6,058,749 A | 5/2000 | Rekemeyer |
| 6,065,914 A | 5/2000 | Fotou |
| 6,171,034 B1 * | 1/2001 | Burgoon et al. .................. 410/3 |
| 6,655,885 B2 | 12/2003 | Trauthwein |
| 6,715,972 B2 | 4/2004 | Jackson |
| 2006/0198711 A1 | 9/2006 | Mock |

* cited by examiner

*Primary Examiner* — Stephen Gordon
(74) *Attorney, Agent, or Firm* — William L. Chapin

(57) ABSTRACT

An apparatus for securing one or two personal transport vehicles such as motorcycles or ATV's in an upright position on a support surface such as the bed of a truck or the ground includes a pair of elongated straight handlebar struts telescopically adjustable to a length fixable by a first key lock. Each strut has an upper hook lockable by a second key lock to a handlebar of a personal transport vehicle, and a lower hook securable within a perforation through an anchor member such as a truck bed component or an elongated, perforated channel member, by a third key lock. The apparatus includes an elongated cross-lock arm telescopically adjustable to a length fixable by a cross-lock arm key lock. Each cross-lock arm has at one end thereof a swivelable hook for engaging a structural member of a personal transport vehicle, and at the other end a fixed hook for engaging a perforation through an eye plate protruding from the strut, the longitudinal position of which eye plate is adjustable on the strut. A pair of struts and a pair of cross-lock arms are used to secure a single vehicle, and a pair of vehicles is securable by a pair of struts and single cross-lock arm disposed between the vehicles.

16 Claims, 20 Drawing Sheets

DETAIL C

DETAIL A

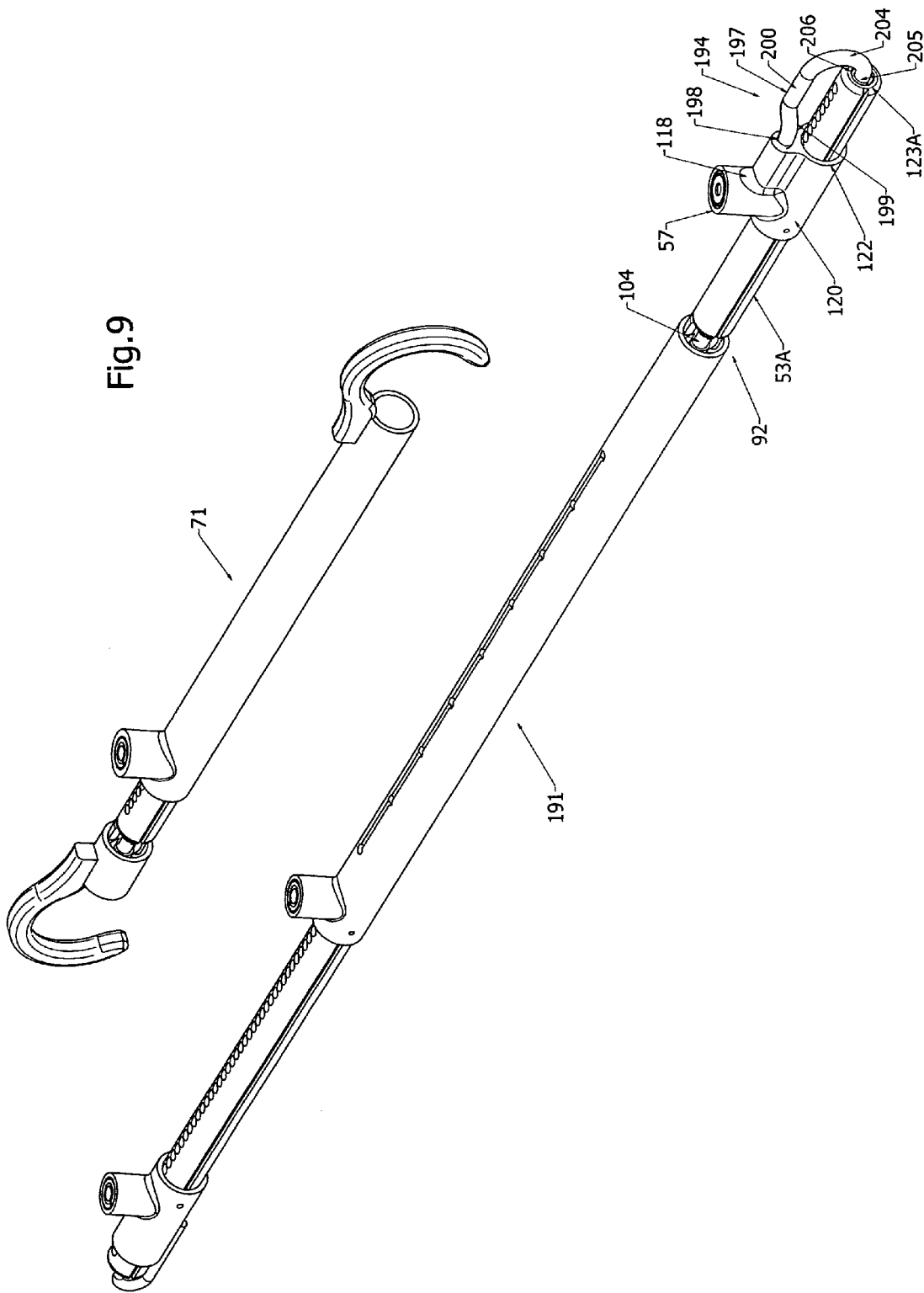

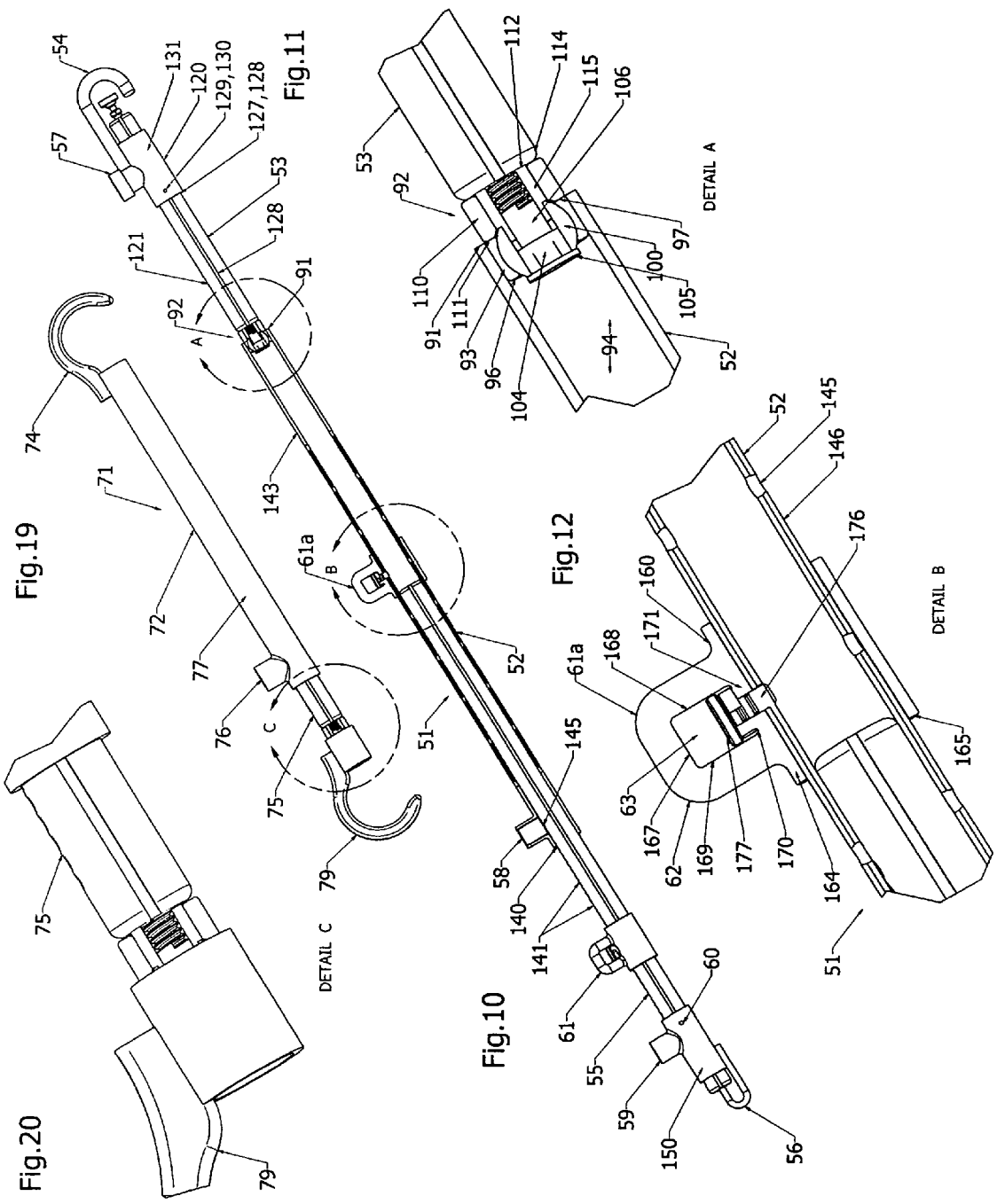

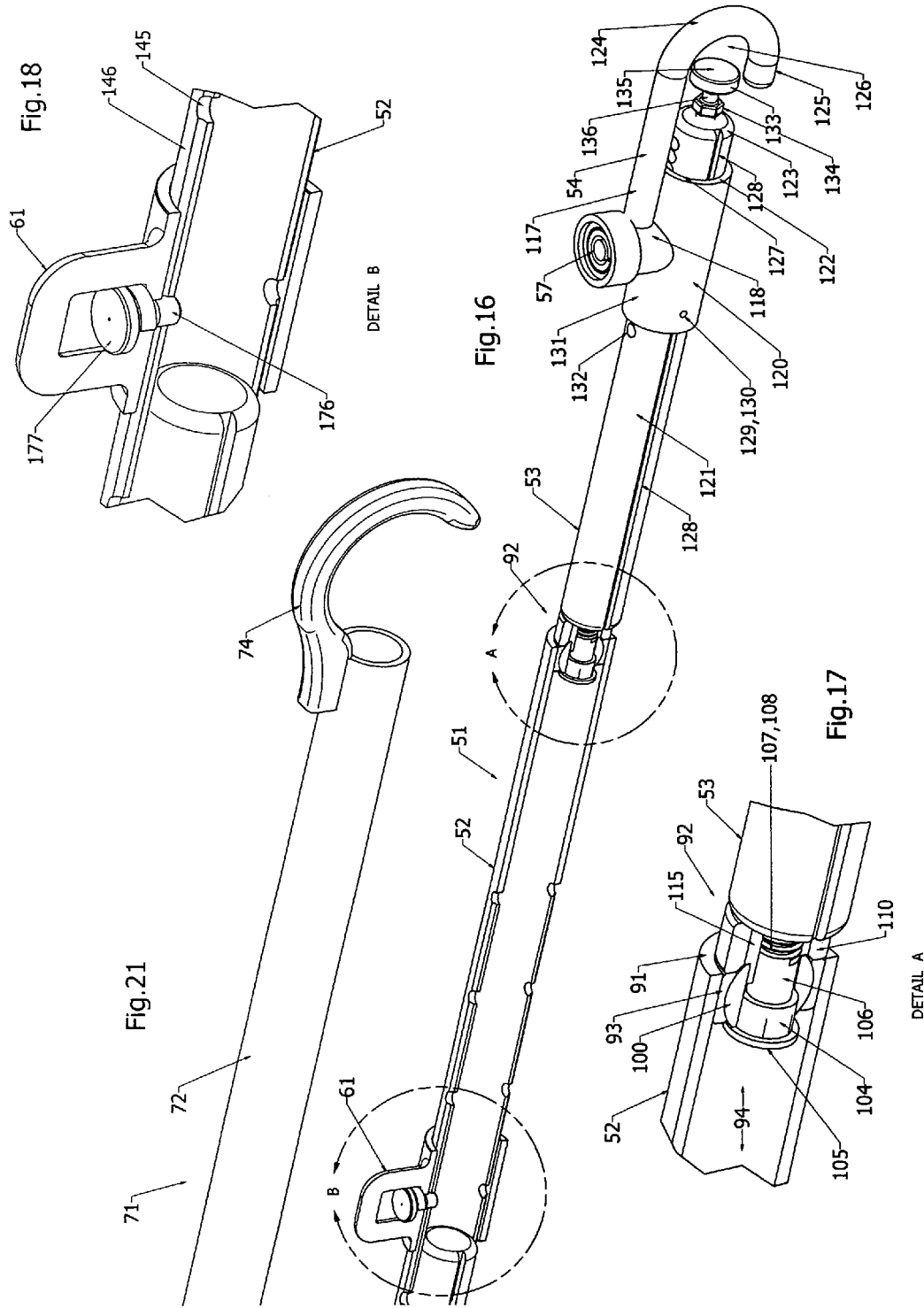

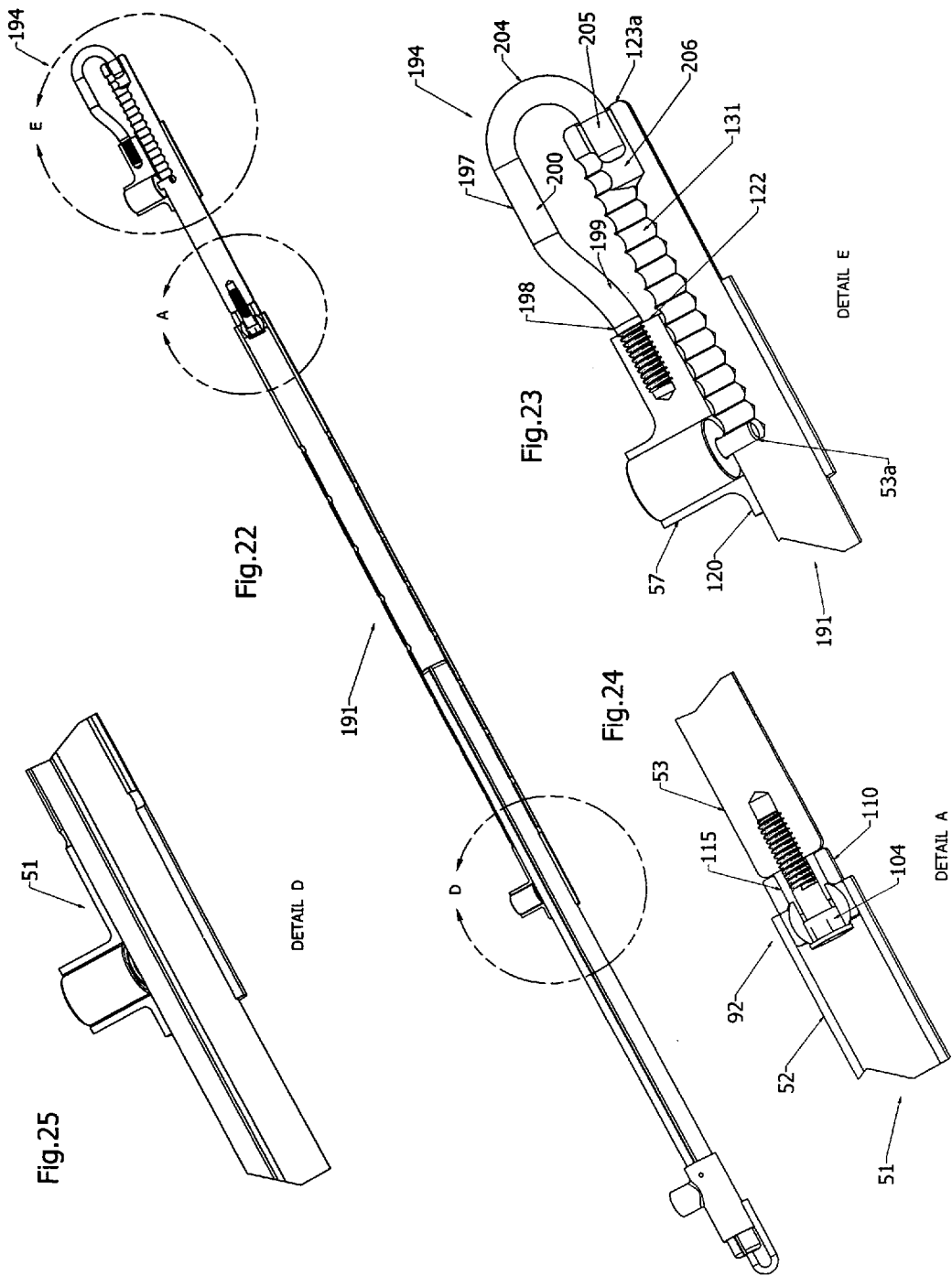

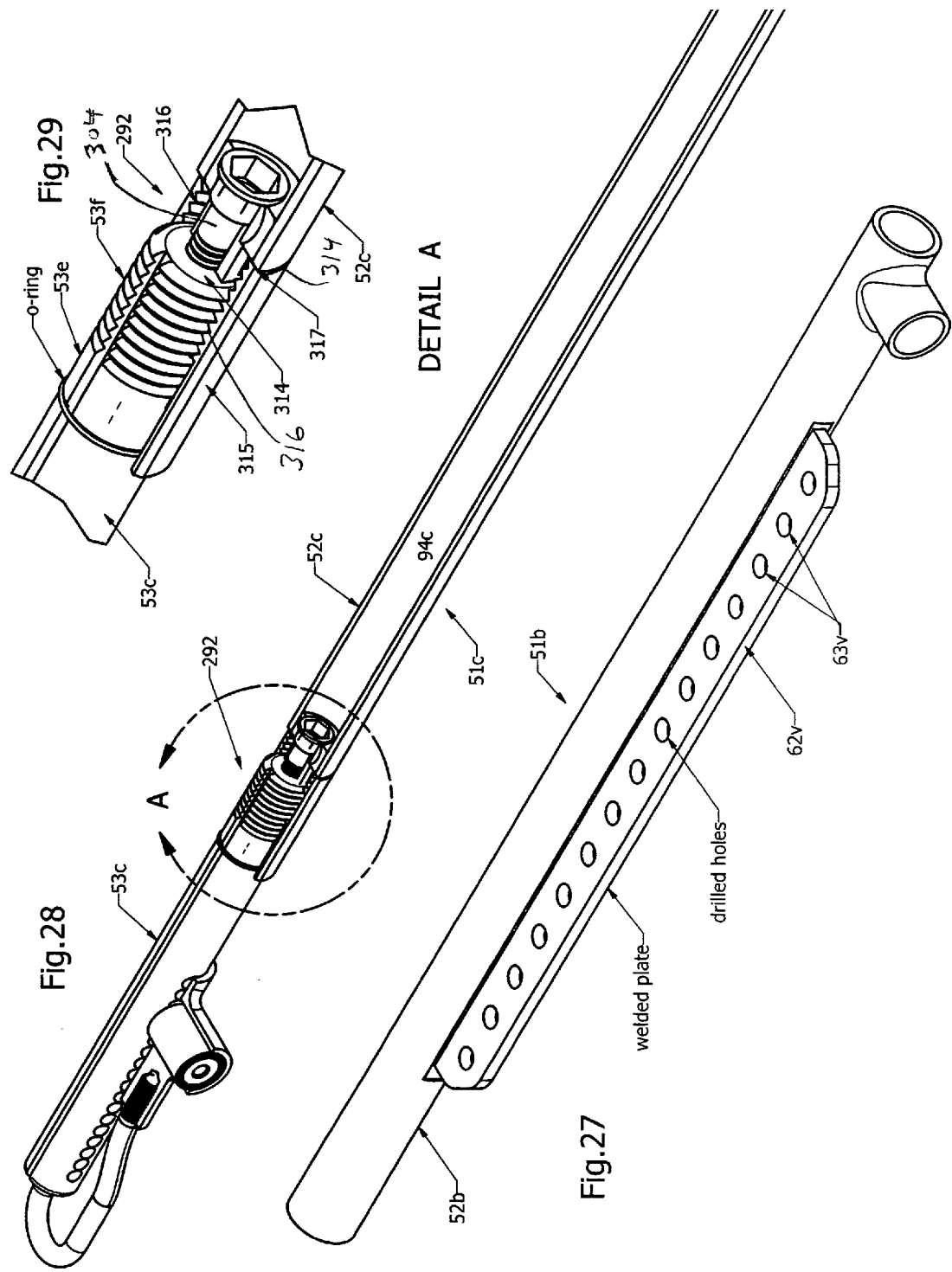

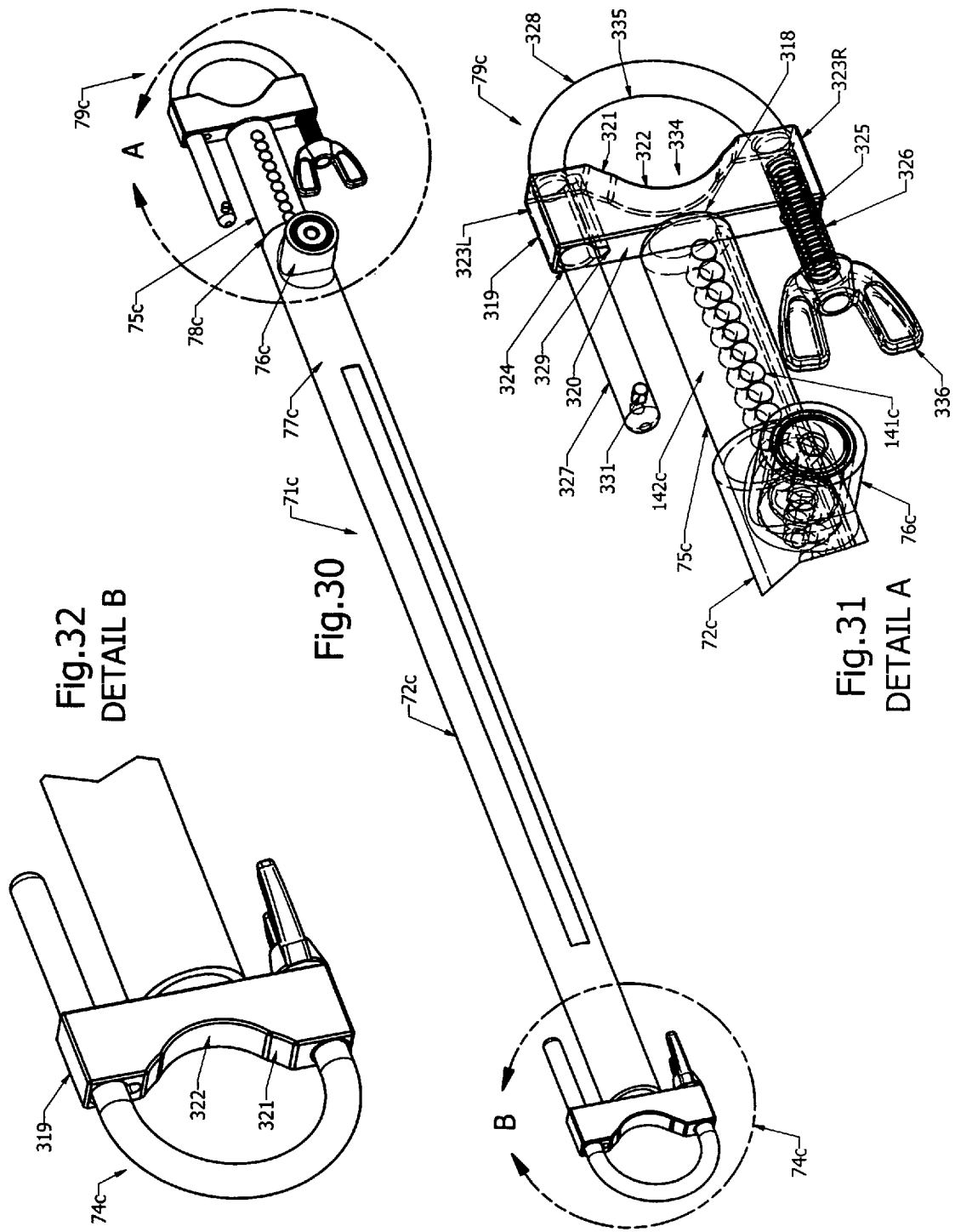

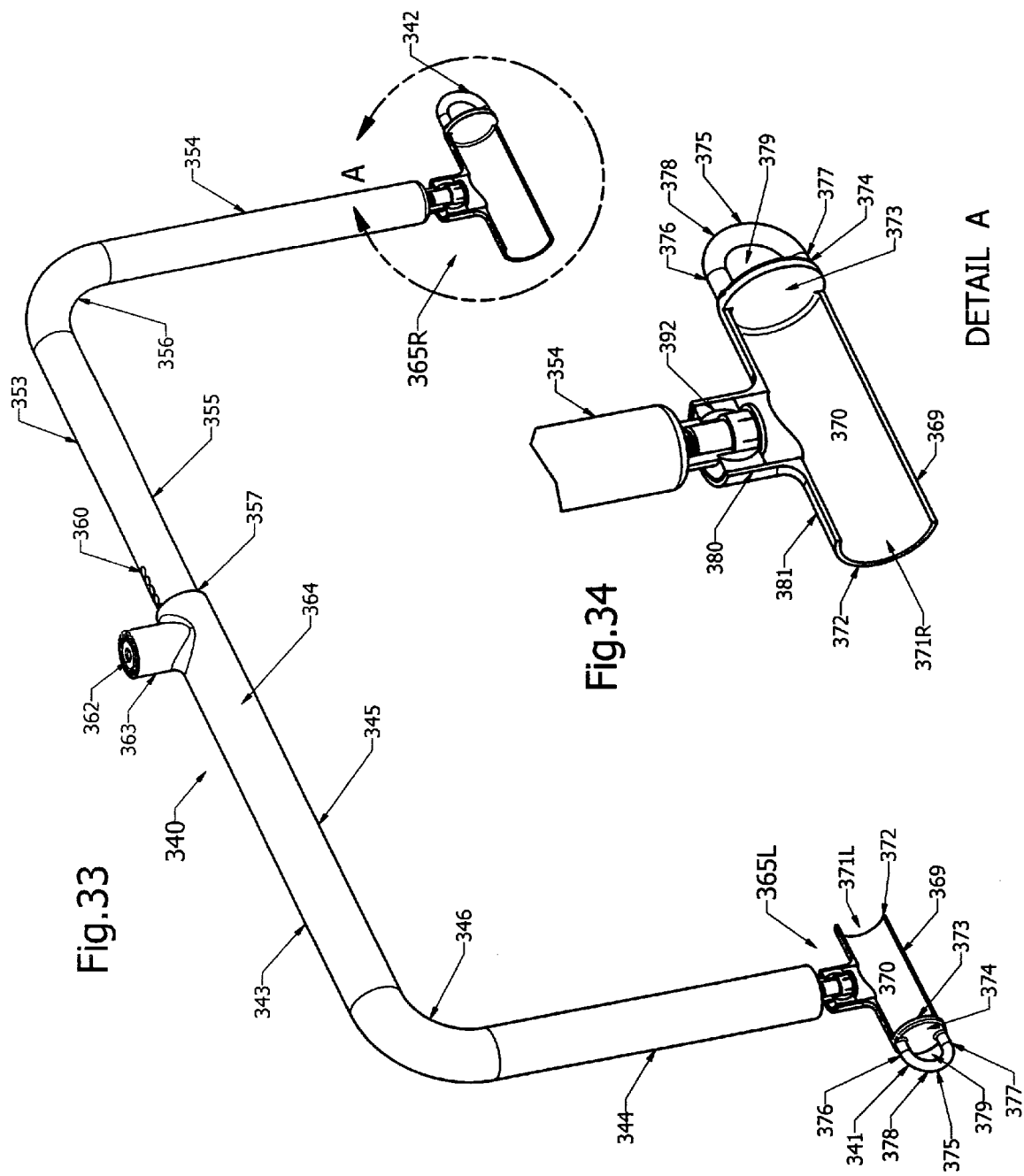

ATV/MOTORCYCLE LOCKDOWN APPARATUS

BACKGROUND OF THE INVENTION

A. Field of the Invention

The present invention relates to accessory devices for use with All Terrain Vehicles (ATV's), motorcycles or similar personal transport vehicles. More particularly, the invention relates to an apparatus for securing in an upright position a vehicle such as an ATV or motorcycle, or pairs thereof, within the bed of a truck used to transport the vehicle, or to an anchor member such as an elongated channel or tube placed on the ground, to discourage theft of the vehicle.

B. Description of Background Art

Motorcycles and ATV's are routinely transported in the beds of pick-up trucks to and from the owner's residences to destinations such as off-road recreational areas. Customarily, an ATV or motorcycle is positioned upright in a truck bed, and secured therein by tie-down cords, cables or the like. Typically, a tie-down cord is fastened at one or both ends thereof to a bracket or other part of a truck bed or body, the cord being fastened to or looped around a component of the ATV or cycle. To ensure that the ATV or motorcycle remains securely positioned relative to the truck bed as a conveying vehicle accelerates, decelerates or turns, it is usually required that the tie-down cords exert a substantial compressive force on the tires and suspension components of the ATV or motorcycle. The tie-down forces can be sufficiently large to cause fatigue or distortion of suspension components and tires of an ATV or motorcycle.

Another problem encountered by owners of ATV's or motorcycles is the possibility that these vehicles might be stolen when left unattended at remote locations, or even from the owner's truck. In view of the foregoing problems, a variety of devices have been disclosed which are intended to secure ATV's or motorcycles against shifting within a vehicle used to transport the vehicles. Also, devices have been disclosed which are intended to discourage theft of ATVs or motorcycles, either from the bed of a transporting vehicle, from publications disclose devices intended to accomplish one or more of the foregoing objectives:

Martin, U.S. Pat. No. 5,813,259, Locking Device: Discloses a locking stand for preventing theft of portable objects, such as boats, ATVs and bicycles.

Weaver, U.S. Pat. No. 6,036,417, Mar. 14, 2000, Stabilizing Arm For All-Terrain Vehicle Discloses a stabilizing arm for stabilizing an All Terrain Vehicle in the bed of a pickup truck.

Rekemeyer, U.S. Pat. No. 6,058,749, May 9, 2000, Combination Anti-Skid Anti-Theft And Vehicle Lifting System.

Fotou, U.S. Pat. No. 6,065,914, May 23, 2000, Apparatus For Securing A Vehicle.

Voiculescu, U.S. Pat. No. 6,524,041, Feb. 25, 2003, Locking Ratchet For A Lashing Mechanism: Discloses a tie-down assembly for securing an article by a strap.

Trauthwein, U.S. Pat. No. 6,655,885, Dec. 2, 2003, Tie Down Bar For Motorcycles: Discloses a tie down device for securing modern sport type motorcycles having a full fairing to a truck or trailer bed without damaging the fairing.

Jackson, Sr., U.S. Pat. No. 6,715,972, Apr. 6, 2004, Rigid Tie-Down Device For Securing A Two-Wheeled Vehicle: Discloses a non-compressing device for securing a two-wheeled vehicle to a towing apparatus.

Bosley, U.S. Publication No. 2003/0059269, Mar. 27, 2003, Cargo Restraint Apparatus Discloses a cargo restraint apparatus for use to secure a load on a vehicle which includes a frame assembly, a reel, and an elongated strap.

Quinn et al., U.S. Publication No. 2004/0011096, Jan. 22, 2004, Theft Deterrent-Device For ATVs (All Terrain Vehicles): Discloses a method of securing a vehicle in place on the ground which includes an articulating head and an auger for burrowing into the ground.

The present invention was conceived of to provide a versatile ATV/motorcycle lockdown apparatus which is useable to secure one or more small vehicles such as ATV's or motorcycles in an upright disposition within the bed of a truck or trailer used to transport the vehicle, or in place on the ground.

OBJECTS OF THE INVENTION

An object of the invention is to provide an apparatus for mechanically securing a personal transport vehicle such as a motorcycle or All Terrain Vehicle (ATV) in a fixed position in a truck bed to prevent movement of the vehicle within the truck bed when the truck is in motion. Another object of the invention is to provide an ATV/motorcycle lockdown apparatus which is useable both to secure a personal transport vehicle such as an ATV or motorcycle, or pairs of such vehicles, within the bed of a truck or on the ground, to thwart theft of the vehicle or vehicles.

Another object of the invention is to provide an ATV/motorcycle lockdown apparatus which does not require the use of tie down cords.

Another object of the invention is to provide an ATV/motorcycle lockdown apparatus which does not exert compressive forces on suspension components or tires of a vehicle secured by the apparatus.

Another object of the invention is to provide an ATV/motorcycle lockdown apparatus which is useable to support ATV's, motorcycles and similar small personal transport vehicles in an upright position in trucks, trailers and on the ground, and which may also be used as a work stand to support such a vehicle while maintenance or repair operations are performed thereon.

Another object of the invention is to provide an ATV/motorcycle lockdown apparatus which is readily operable by a single individual using a key.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends a lockdown apparatus for temporarily securing a personal transport vehicle such as a motorcycle, All Terrain Vehicle (ATV), or pairs of such vehicles in place on a support surface such as a truck bed or the ground. An ATV/motorcycle lockdown apparatus according to the present invention includes a pair of elongated handlebar support struts and one or two shorter cross-lock arms which are used to secure in an upright position two motorcycles in a side-by-side disposition, a single motorcycle, or ATV. According to the invention, a pair of handlebar support struts and a pair of cross-lock arms are used to secure a single motorcycle or ATV.

A preferred method of using the lockdown apparatus of the present invention to secure ATV's or motorcycles in place on the ground utilizes an anchor member such as a longitudinally elongated rectangular steel tube or channel which is provided with spaced apart perforations through a longitudinally disposed wall thereof, the anchor member being disposed transversely on the ground in front of the handlebars of the vehicle or vehicles to be secured. When the apparatus is used to secure ATV's or motorcycles to a truck bed, existing laterally spaced apart perforations in a forward part of the truck bed may be used. Alternatively, a steel tube or channel, or similar anchor member, may be temporarily or permanently secured to the truck bed in a transversely disposed orientation.

According to the invention, each handlebar support strut includes an elongated, straight cylindrically-shaped member which is telescopically adjustable to a desired length, and provided with one or more key locks to secure the strut at its adjusted length. Each strut is provided at an upper end thereof with a J-hook of relatively large cross-section and a U-shaped opening which is hooked over and locked onto a separate handlebar of a vehicle to be secured. Each strut is provided at the lower end thereof with a relatively smaller J-hook which is of relatively smaller circular cross-section and of an appropriate diameter to be insertably receivable in a selected perforation of a transversely disposed steel channel or tube, or other anchor member. Preferably, the lower J-hooks of the two handlebar struts are hooked into a pair of perforations located equidistant from opposite sides of a vertical longitudinally disposed center plane of a motorcycle or ATV to be secured. The handlebar support struts are disposed obliquely upwardly and inwardly from the anchor member towards the vehicle center plane. The larger J-hooks at the upper ends of the handlebar support struts are hooked around intermediate portions of left and right handlebars of the motorcycle or ATV. Each upper J-hook is secured in place to a handlebar by a first, upper key lock, the telescopically adjustable length of the handlebar support strut is secured by a second, intermediate key lock, and the lower J-hook is inserted into a perforation through the anchor member and secured there by a third, lower key lock.

A preferred embodiment of a telescopically adjustable handlebar support strut according to the present invention includes an intermediate tubular section, and a cylindrical upper bar section which is swivelably mounted to an upper end of the intermediate tubular section by a ball-and-socket type joint. The upper J-hook is telescopically mounted to the exterior of the upper end of the upper bar.

A preferred handlebar support strut construction according to the present invention also includes a lower cylindrical bar section which fits telescopically within a coaxial inner bore of the intermediate tubular section, and secured at adjustable extensions from the tubular section by the intermediate key lock. The lower J-hook protrudes from a lower transverse end of the lower cylindrical bar section, and the opening of the lower J-hook is closed after the hook is inserted through a perforation of an anchor member, by sliding a sleeve mounted on the outside of the lower cylindrical bar section downwardly towards the inward curved end of the hook and securing the sleeve in that position by the lower key lock.

Each cross-lock arm of the lockdown apparatus according to the present invention includes an elongated, straight tubular section which has at a first end thereof a first longitudinally disposed upper C-hook which is fixed to and protrudes from a first transverse end of the tubular section. The cross-lock arm also includes an elongated cylindrical bar which is telescopically received in a coaxial bore disposed through the tubular section, the bar having an extension distance from the lower transverse end of the tubular section which is telescopically adjustably and secureable at a desired extension by a cross-lock arm key lock. The lower end of the cylindrical bar has protruding from a lower transverse end thereof a second longitudinally disposed C-hook similar in construction to the first C-hook, but which is swivelably joined to the bar.

When the ATV/motorcycle lockdown apparatus according to the present invention is used to secure a single vehicle, a pair of cross-lock arms are used, with the first, fixed C-hook of each cross-lock arm hooked into a perforation through an eye plate which protrudes radially from a floating collar assembly that is slidably mounted on the outside of the lower cylindrical bar section, or on intermediate tubular section of, each handlebar strut. The floating collar assembly is slidably adjustable on the lower cylindrical bar section or intermediate tubular section of a handlebar strut, and a selected longitudinal position thereon maintained by a spring-loaded detent button which protrudes into a selected one of a plurality of longitudinally spaced apart circular grooves or perforations provided in the outer circumferential wall surface of the cylindrical bar or tube on which the collar is mounted. Each cross-lock arm is disposed obliquely rearwardly and inwardly towards a center plane of a vehicle, from a floating collar assembly on a handlebar strut, and the second, swivelable C-hook thereof hooked around a lower chassis or engine component of a motorcycle or ATV, and secured in that position by the cross-lock arm key lock which protrudes radially from a lower end of the cross-lock arm and locks the arm at a selected extension length.

When the lockdown apparatus according to the present invention is used to secure a pair of motorcycles or ATV's side-by-side, the handlebar struts are deployed in a fashion similar to that used to secure a single vehicle, except that one handlebar strut is attached to one handlebar, e.g., the right handlebar of a first, right-hand vehicle, while the other handlebar strut is attached to the opposite handlebar of the adjacent vehicle. Also, when the lockdown apparatus according to the present invention is used to secure two vehicles, a single cross-lock arm is disposed horizontally between inner facing parts of two adjacent vehicles, and the two C-hooks at the opposite end of the cross-lock arm secured to the two vehicles.

BRIEF DESCRIPTION OF THE DRAWINGS

FIG. 9 is a perspective view of a modification of the apparatus of FIG. 1, in which a handlebar strut thereof has a modified upper J-hook.

FIG. 10 is a side elevation view of a handlebar strut component of the apparatus of FIG. 7, partly in longitudinal section.

FIG. 11 is a fragmentary, partly sectional view of the handlebar strut of FIG. 10, showing details of an upper swivel joint thereof.

FIG. 12 is a fragmentary, partly sectional view of the handlebar strut of FIG. 10, showing details of a floating collar assembly thereof.

FIG. 16 is a fragmentary, partly sectional perspective view of the handlebar strut of FIG. 10, showing details of an upper J-hook and locking mechanism thereof.

FIG. 17 is a fragmentary partly sectional perspective view of the handlebar strut of FIG. 10, showing details of an upper swivel joint thereof.

FIG. 18 is a fragmentary, partly sectional perspective view of the handlebar strut of FIG. 10, showing details of floating collar assembly thereof.

FIG. 19 is a perspective view of the cross-arm lock of FIGS. 7 and 9.

FIG. 20 is a fragmentary, partly sectional side elevation view of the cross-lock arm of FIG. 19, on an enlarged scale, showing details of a swivel joint for a second, lower C-hook thereof.

FIG. 21 is a fragmentary, enlarged-scale perspective view of the cross-lock arm of FIG. 20, showing details of an upper, fixed C-hook thereof.

FIG. 22 is a partly sectional side elevation view of a modification of the handlebar strut of FIG. 10.

FIG. 23 is a fragmentary, partly sectional view of the modified handlebar strut of FIG. 22, showing details of the modified upper J-hook thereof.

FIG. 24 is a fragmentary, enlarged scale, partly sectional view of the handlebar strut of FIG. 22, showing details of an upper swivel joint thereof.

FIG. 25 is a fragmentary, enlarged scale, partly sectional view of the handlebar strut of FIG. 22, showing details of a lower key lock thereof.

FIG. 27 is a fragmentary perspective view of another modification of the handlebar strut of FIG. 10, in which floating collar assemblies thereof are replaced by an elongated multi-perforation eye plate.

FIG. 28 is a fragmentary, partly broken-away perspective view of another modification of the handlebar strut of FIG. 10, in which an upper swivel joint thereof is lockable at a fixed orientation.

FIG. 29 is a broken-away view of the lockable swivel joint of FIG. 28, on an enlarged scale.

FIG. 30 is a perspective view of a modification of the cross-lock arm of FIGS. 7, 19 and 20.

FIG. 31 is a fragmentary perspective view of an extending, lockable end of the cross-lock arm of FIG. 30, on an enlarged scale.

FIG. 32 is a fragmentary perspective view of a fixed-length end of the cross-lock arm of FIG. 30, on an enlarged scale.

FIG. 33 is a partly sectional perspective view of a handlebar locking arm according to the present invention.

FIG. 34 is a partly sectional view showing a handlegrip receptacle of the handlebar locking arm of FIG. 33, on an enlarged scale.

DESCRIPTION OF THE PREFERRED EMBODIMENTS

FIGS. 1-6 illustrate an ATV/motorcycle lockdown apparatus according to the invention, in use to secure one or two motorcycles to an anchor member on the ground, or to a truck bed.

FIGS. 7-21 illustrate structural features of a handlebar support strut and cross-lock arm which comprise two components of an ATV/motorcycle lockdown apparatus according to the present invention.

FIGS. 22-35 illustrate modifications of lockdown apparatus components according to the present invention.

Figure 1:
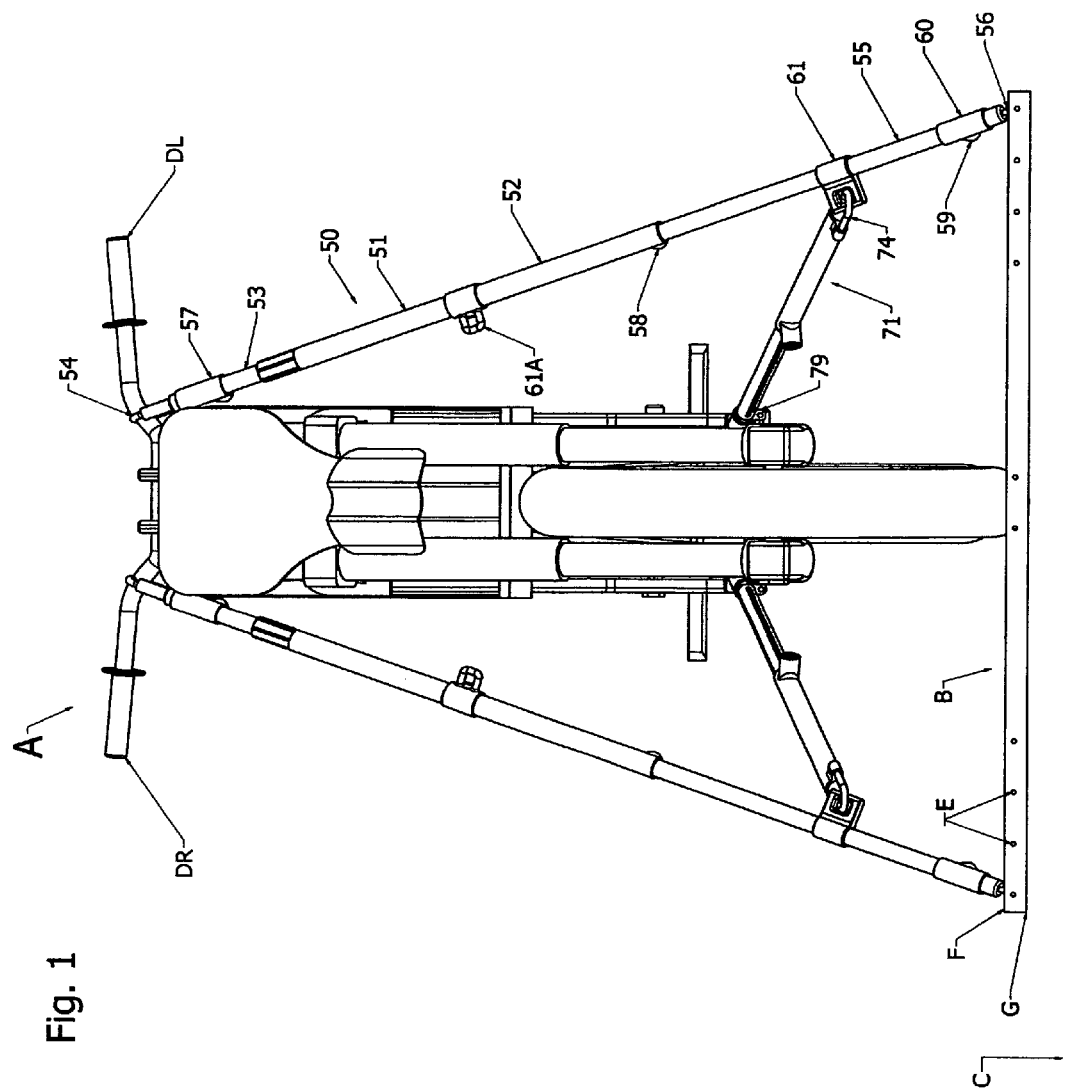
FIG. 1 is a front perspective view of a basic embodiment of an ATV/motorcycle lockdown apparatus according to the present invention showing two handlebar struts and two cross-arm locks of the apparatus in use to secure a motorcycle to a transversely disposed perforated angle iron used as an anchor member.
Figure 2:
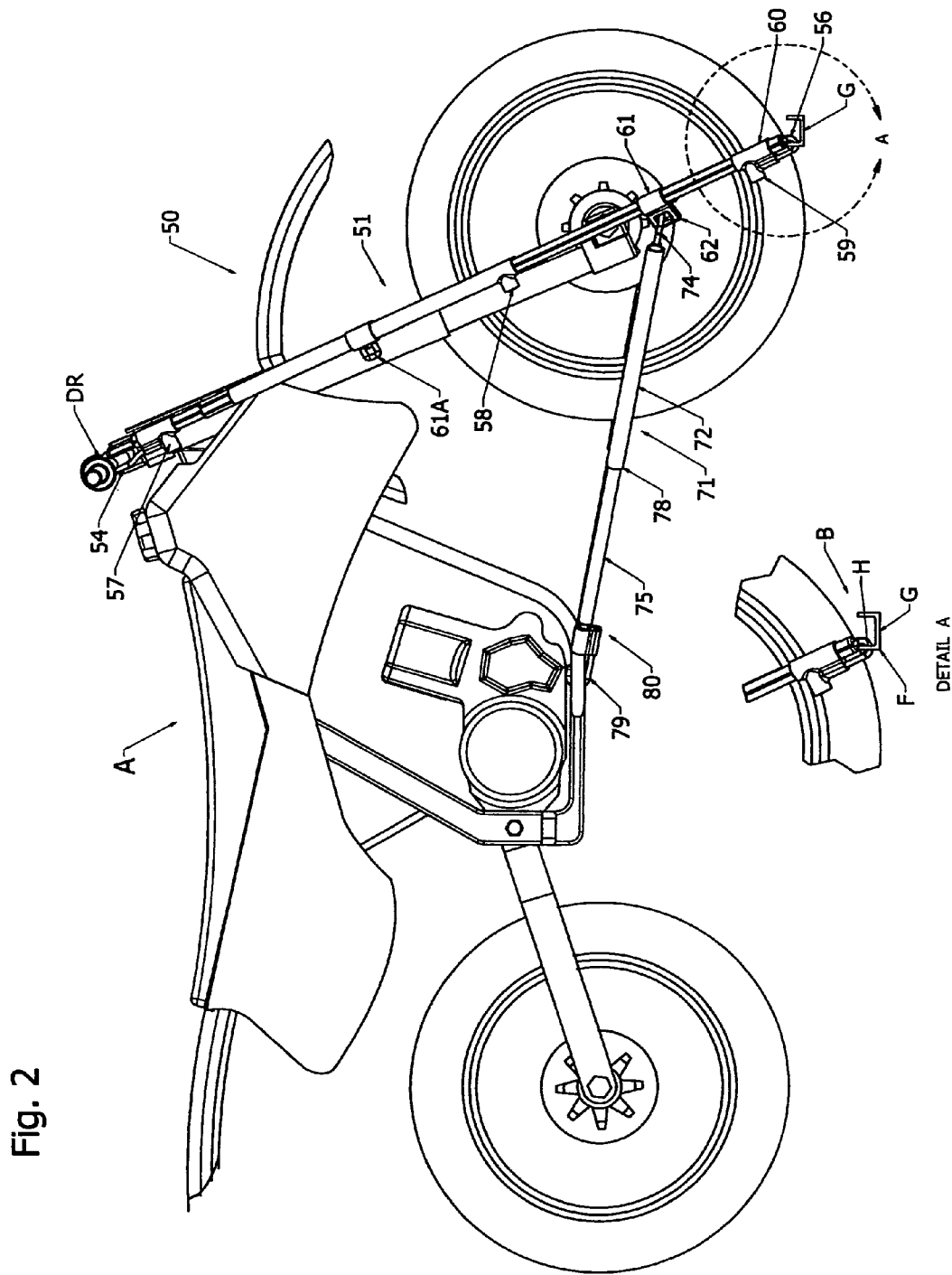
FIG. 2 is a side perspective view of the apparatus of FIG. 1.

Referring first to FIGS. 1 and 2, an ATV/motorcycle lockdown apparatus 50 according to the present invention may be seen to include an elongated, straight handlebar support strut 51 and a shorter, straight cross-lock arm 71, pairs of each of which are attached to an elongated anchor member B comprising a length of C-cross-section channel iron, and to a motorcycle A to secure the motorcycle in an upright position on a ground surface C.

As shown in FIGS. 1 and 2, each handlebar support strut 51 includes a relatively long, straight longitudinally centrally located or intermediate tubular section 52. A shorter elongated straight upper cylindrical bar section 53 protrudes longitudinally from an upper transverse end of intermediate tubular section 52 and as shown is generally coaxially aligned with but pivotably mounted to the central tubular section. Upper cylindrical bar section 53 is terminated at an upper end thereof by an upper J-hook 54 which is hooked around a handlebar D of motorcycle A, e.g., left handlebar DL.

Handlebar support strut 51 also has a lower elongated straight cylindrical bar section 55 which is telescopically held within a coaxial bore disposed longitudinally through central tubular section 52, and extendable from a lower transverse end thereof. Lower cylindrical bar section 55 is terminated at a lower end thereof by a lower J-hook 56 which is of a smaller diameter cross-section than upper J-hook 54, and of an appropriate size to be insertably receivable through a selected one of a plurality of longitudinally spaced apart perforations E provided through an upright vertical wall F which protrudes upwardly from a base plate G of angle iron channel support anchor member B.

As shown in FIGS. 1 and 2, each handlebar support strut 51 includes an upper cylindrical key lock 57, which is used to secure upper J-hook 54 to a handlebar D, an intermediate cylindrical key lock 58 to maintain cylindrical lower bar section 55 at a selected predetermined extension length from central tubular section 52, and a lower cylindrical key lock 59 and sleeve assembly 60 to secure lower J-hook 56 to anchor member B.

As may be seen best by referring to FIG. 1, each handlebar support strut 51 preferably includes at least one, e.g., a lower, floating collar assembly 61 which is longitudinally slidably mounted on the outer cylindrical wall surface of lower cylindrical bar section 55. Floating collar assembly 61 has protruding radially outwardly therefrom a longitudinally disposed eye plate 62 provided with a perforation 63 through its thickness dimension.

Referring still to FIGS. 1 and 2, it may be seen that each cross-lock arm 71 includes a longitudinally elongated, straight, tubular section 72. Tubular section 72 of cross-lock arm 71 has a first, fixed C-shaped hook 74 which protrudes longitudinally outward from a first transverse end of the tubular section, the hook having the shape of a uniform thickness bar bent into the shape of a C, one leg of which is fastened to an end of the tubular section, with opposite parallel sides of the bar disposed parallel to and equidistant from a longitudinal center plane of the tubular section.

Figure 7:
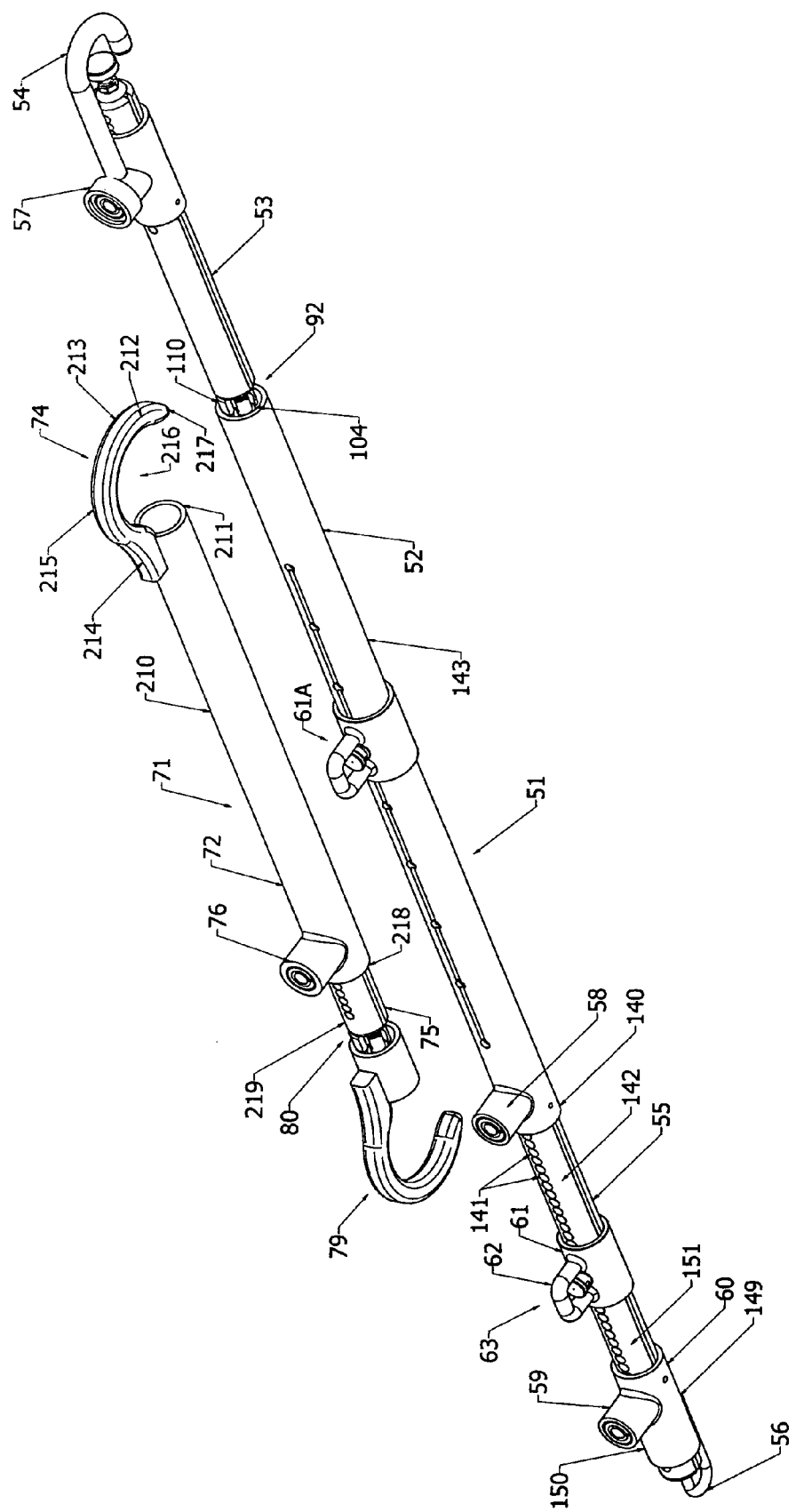
FIG. 7 is a perspective view of a handlebar strut and cross-arm lock comprising two different components of the lockdown apparatus of FIG. 1.

As shown in FIGS. 7, 9 and 19, cross-lock arm 71 also has a cylindrical bar section 75 which is telescopically slidably held within a central coaxial bore 73 disposed longitudinally through tubular section 72. Cylindrical bar section 75 is telescopically extendible a selectable distance from tubular section 72 of cross-lock arm 71, and fixed at that distance by a cylindrical key lock 76 which protrudes radially outwards from an outer cylindrical wall surface 77 of the tubular section, near lower transverse end 78 thereof. Cross-lock arm 71 also includes a second, swivelable C-hook 79 similar in construction to C-hook 74, which protrudes longitudinally outwards from a swivel joint 80 fastened to an end of lower cylindrical bar section 75.

As shown in FIGS. 1-4, apparatus 50 is used to secure a motorcycle A to an anchor member B such as an elongated length of channel iron which has a base wall G supported on a surface C, such as a ground surface. Anchor member B has a first flange plate F which protrudes vertically upwards from base plate G that has formed through its thickness dimension a plurality of longitudinally spaced apart perforations E, and has a second flange plate H which protrudes upwardly from an opposite longitudinal edge of the base plate.

As shown in FIG. 1, the lower J-hook 56 of each of a pair of spaced apart handlebar struts 51 is hooked into a separate perforation E spaced outwardly from opposite sides of motorcycle A, secured therein by sleeve lock assembly 60, and locked thereat by lower cylindrical key lock 59. Also, the length of handlebar strut 51 is adjusted to span the distance between anchored lower J-hook 56 and a handlebar D of motorcycle A by telescopically adjusting central tubular portion 52 of the handlebar strut relative to lower cylindrical bar section 55 thereof, and locking that length adjustment using intermediate key lock 58. In addition, upper J-hook 54 of each of a pair of handlebar struts 51 is looked around a separate handlebar D of motorcycle A, and secured thereto by upper cylindrical key lock 57.

Figure 3:
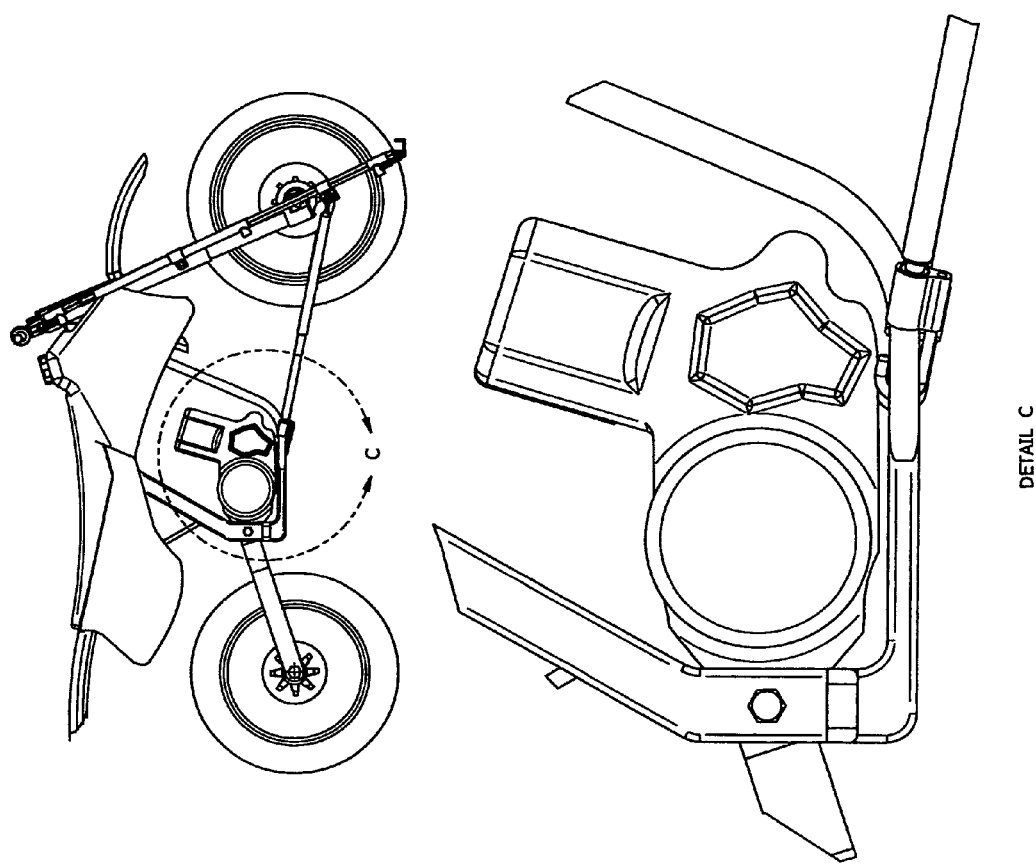
FIG. 3 is a fragmentary side elevation view of the apparatus of FIGS. 1 and 2, showing engagement of a chassis component of the motorcycle by a swivelable C-hook of a cross-arm lock of the apparatus.
Figure 3A:
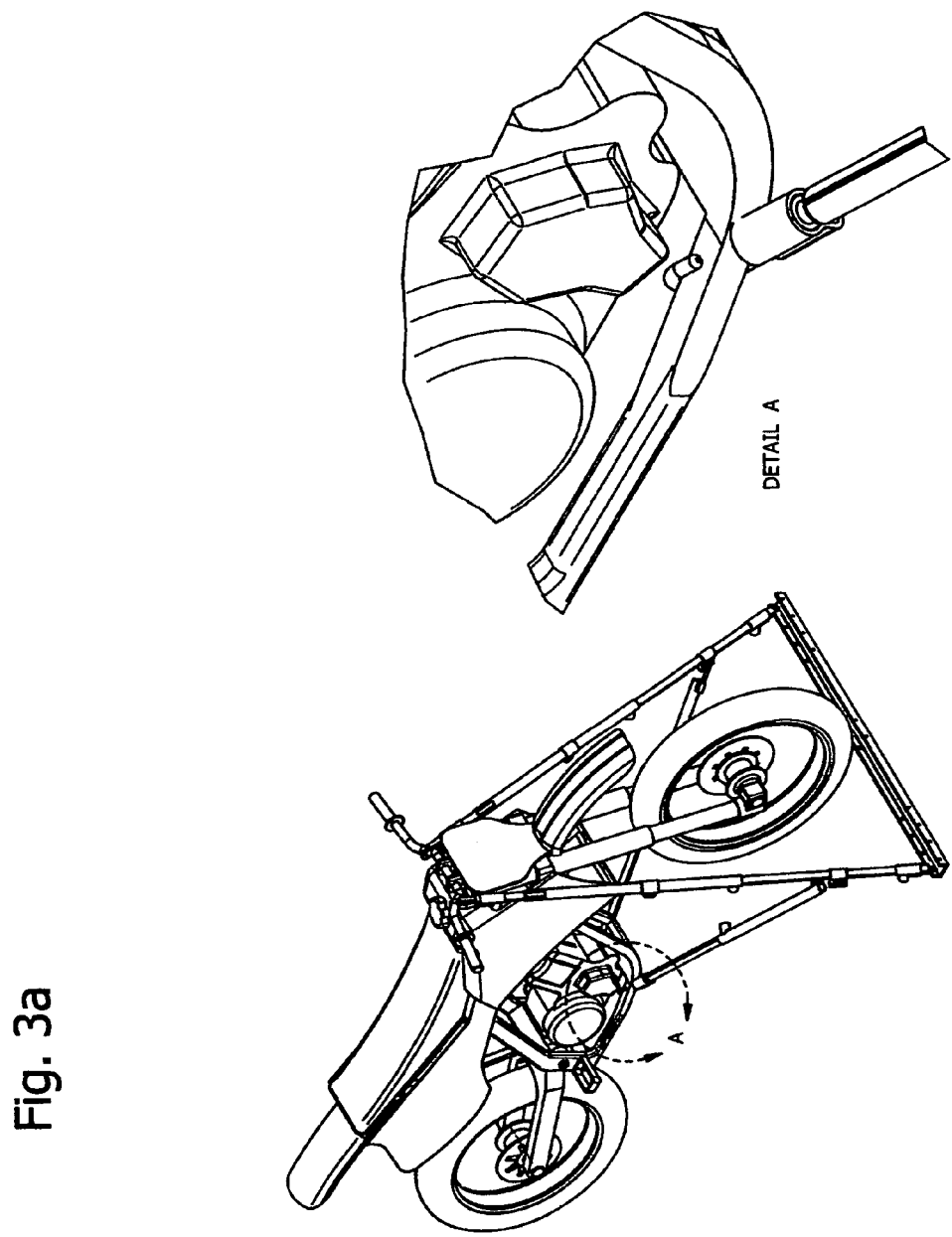
Figure 4:
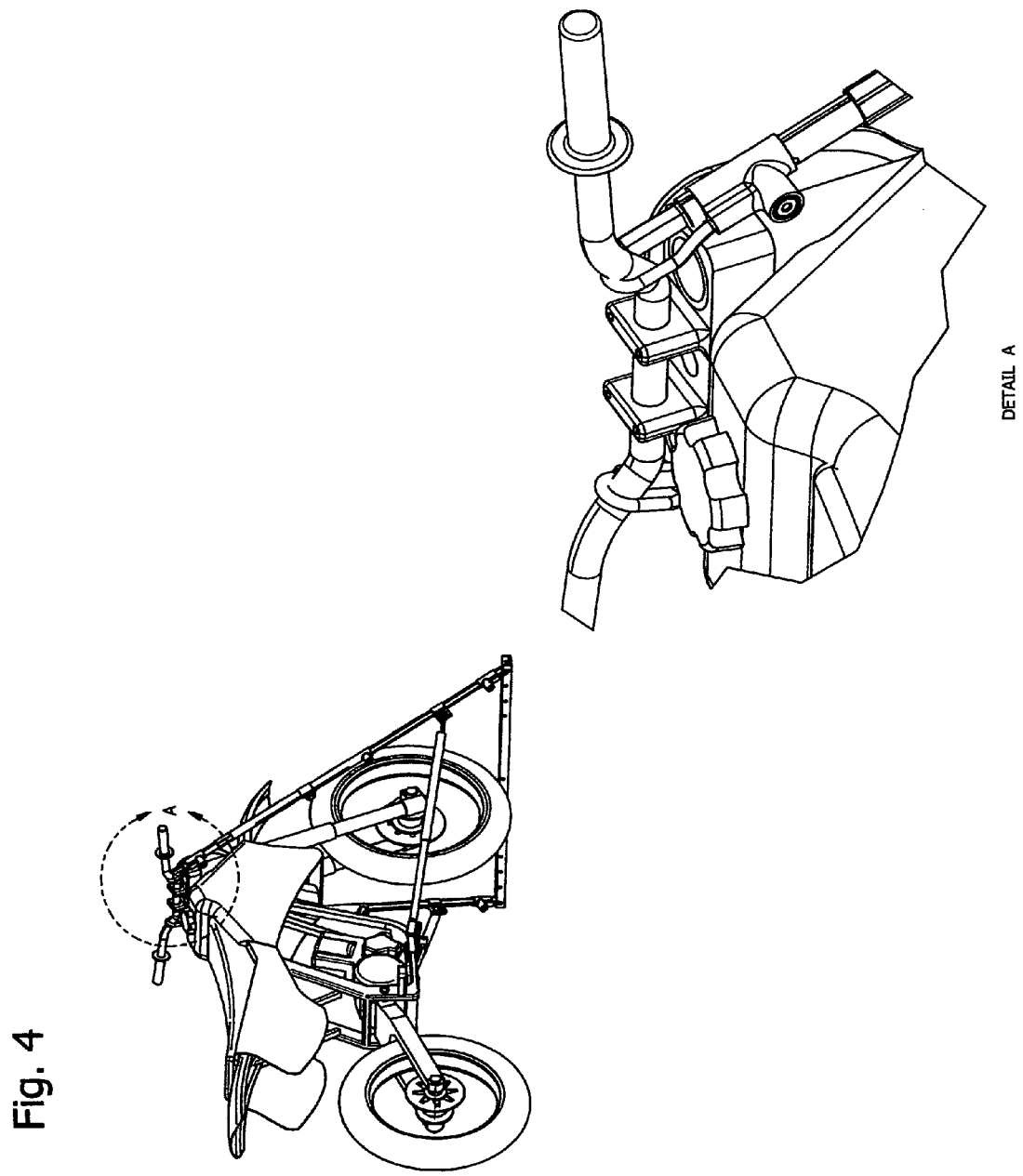
FIG. 4 is a fragmentary perspective view of the apparatus of FIGS. 1 and 2 showing engagement of a handlebar of the motorcycle by an upper J-hook of a handlebar strut of the apparatus.

With a pair of handlebar struts 51 fastened at one end to the handlebars D of a motorcycle A and at the other end to anchor member B, each of a pair of cross-lock arms 71 is fastened to an opposite side of the motorcycle and to an adjacent handlebar strut 51. Thus, as shown in FIGS. 1, 2 and 3, the fixed C-hook 74 of each cross-lock arm 71 is hooked into perforation 63 through eye plate 62 of a separate floating collar assembly 61, which has been slidably adjusted to an appropriate longitudinal position on handlebar support strut 51.

Cylindrical bar section 75 of each cross-lock arm 71 is then telescopically extended an appropriate longitudinal extension length from tubular section 72 of the cross-lock arm to enable swivelable C-hook 79 to be hooked around a motorcycle component, swiveling the hook on joint 80 if necessary. Cylindrical lock 76 of each cross-lock arm 71 is then operated by a key inserted into the lock to a locked position which secures cylindrical bar section 75 of the cross-lock arm at an appropriate extension distance between floating collar assembly 61 and the swivelable C-hook 79 of the cross-lock arm, thus securing the motorcycle in place as shown in FIGS. 1-4.

Figure 5:
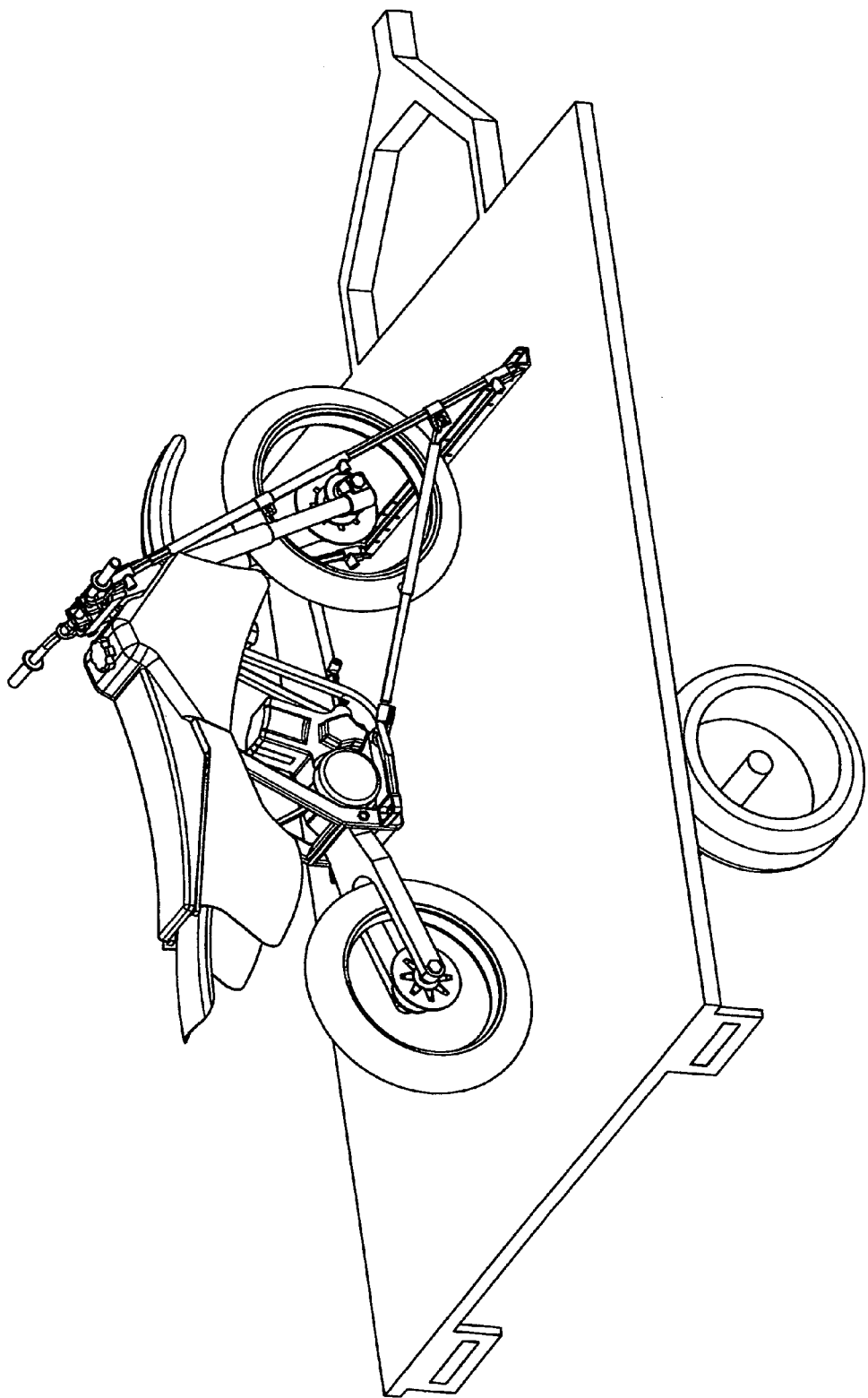
FIG. 5 is a rear perspective view showing the apparatus of FIG. 1 fastened to a pair of tie-down brackets in the lower front portion of a pickup truck bed to secure a motorcycle in the truck bed.

As shown in FIG. 5, the manner of using apparatus 50 to secure a motorcycle to the bed of a truck is substantially identical to the manner of securing a motorcycle to an anchor member placed on the ground, as described above and shown in FIGS. 1-4. However, to secure a motorcycle to a truck bed J, the ends of lower J-hooks 56 of a pair of handlebar support struts 51 are secured in holes L through a pair of laterally spaced apart brackets K located in a lower front portion of the bed of the truck.

Figure 6:
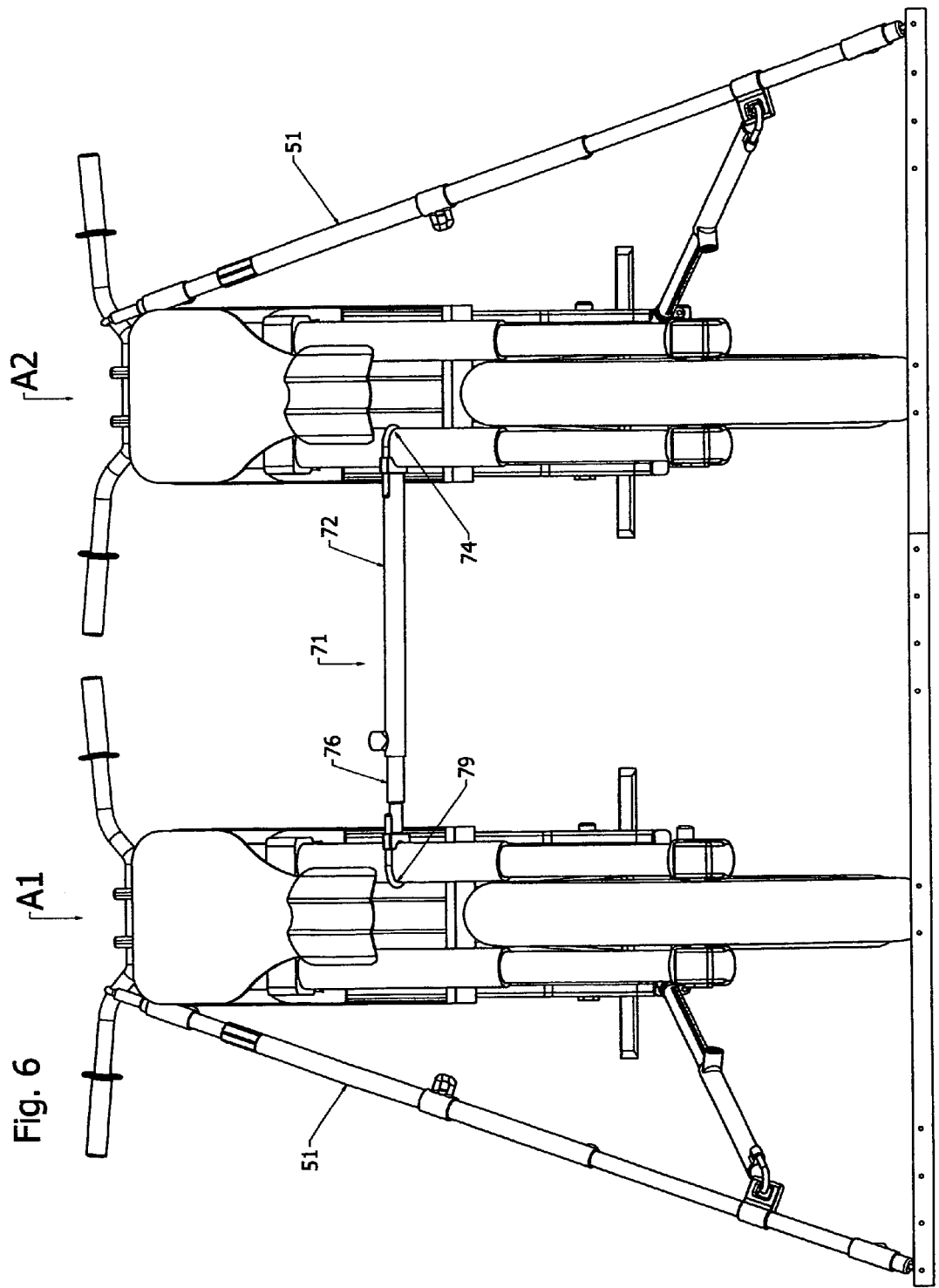
FIG. 6 is a front perspective view showing the apparatus of FIG. 1 in use to secure a pair of motorcycles to a transversely disposed anchor member consisting of a perforated angle iron beam.

FIG. 6 illustrates the manner of using apparatus 50 to secure a pair of upright, side-by-side motorcycles to a transversely disposed perforated channel member placed on the ground, or to a truck bed. As shown in FIG. 6, a pair of handlebar support struts 51 is used exactly as described above to support left and right motorcycle handlebars, but in this case, the left handlebar of a "left" motorcycle and the right handlebar of a "right" motorcycle located adjacent to the right side of the left motorcycle. A single cross-lock arm 71 is then connected between laterally spaced apart and aligned components of the two motorcycles, and locked in place by operating cross-lock arm key lock 76.

FIGS. 7, 8 and 10-18 illustrate construction details of handlebar support strut 51.

Figure 8:
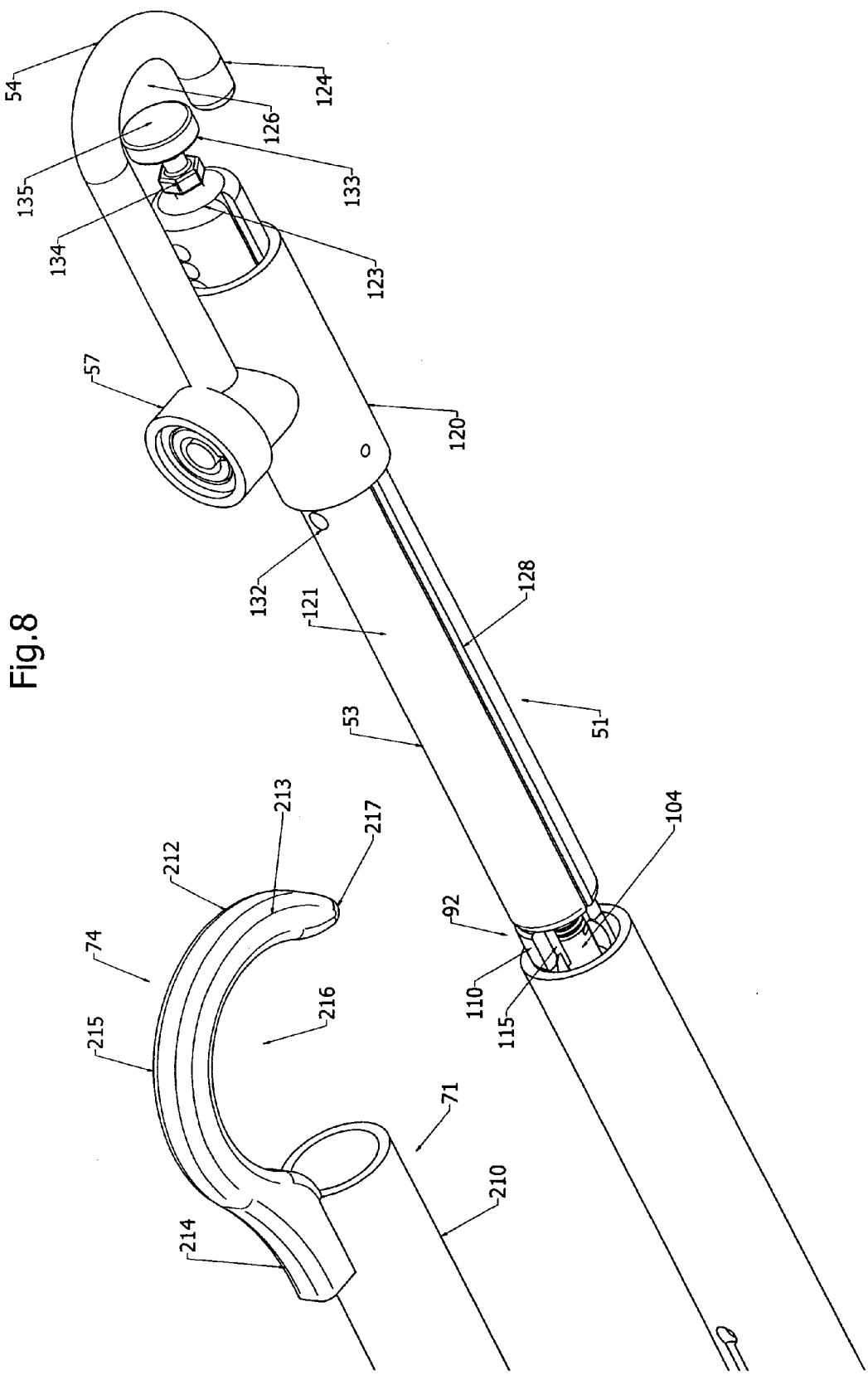
FIG. 8 is a fragmentary, partly sectional view of the apparatus of FIG. 7 on an enlarged scale.

As may be seen best by referring to FIGS. 7, 8 and 10, upper cylindrical bar section 53 of handlebar support strut 51 is preferably connected to upper transverse end 91 of central tubular section 52 of the handlebar support strut by an upper swivelable joint 92. As shown in FIG. 11, swivelable joint 92 includes a cylindrically-shaped bushing 93 which is retained coaxially within a central coaxial bore 94 disposed longitudinally inwards from upper transverse end 91 of central tubular section 52. Bushing 93, of a type sometimes referred to as a Heim Ball Outer Race, has a generally spherically-shaped cavity 95 located concentrically within the bushing, the cavity being truncated equidistant from north and south poles thereof by inner and outer transverse faces 96, 97 to form inner and outer circular bores 98, 99, respectively, which communicate with the cavity.

Upper swivelable joint 92 includes a ball 100 which has parallel, equal diameter truncating faces (Heim Ball Inner Race) which fits rotatably and concentrically within spherical cavity 95 within bushing 93, the ball being truncated by parallel flat opposed circular faces 101, 102. Ball 100 has disposed perpendicularly through truncating faces 101, 102 thereof a coaxial longitudinally disposed cylindrically-shaped bore 103, which receives therethrough an Allen bolt 104.

Allen bolt 104 has a shank 104A which is disposed longitudinally outwardly through bore 103 of ball 100, and has an enlarged head 105 which seats on inner circular face 101 of the ball. Shank 104A has a smooth upper portion 106 which protrudes through outer face 102 of the ball, and a lower portion 107 provided with external helical threads 108. Threaded lower shank 107 of Allen bolt 104 protrudes longitudinally outwardly from upper transverse end 91 of central tubular section 53, and is disposed longitudinally through the central coaxial bore 109 of a generally cylindrically-shaped grommet 110.

Grommet 110 is made of a resilient material such as an elastomeric polyurethane, and has parallel inner and outer transverse faces 111, 112, respectively. Threaded lower shank portion 107 of Allen bolt 104 protrudes outwardly through outer transverse face 112 of grommet 110, and is threadingly received with a blind threaded bore 113 that protrudes inwardly into lower transverse face 114 of upper cylindrical bar section 53. Constructed as described above, joint 92 functions as a swivelable, ball-and-socket type joint which enables upper cylindrical bar section 53 to be oriented at a desired angle relative to central tubular section 52 of handlebar support strut 51. Preferably, swivelable joint 92 includes a cylindrically-shaped steel spacer sleeve 115 which fits coaxially within bore 109 of grommet 110, the spacer having a longitudinally disposed coaxial bore 116 which receives lower shank 107 of Allen bolt 104. Spacer sleeve 115 ensures that a minimum distance is maintained between cylindrical bar section 53 and central tubular section 52 of strut 51.

As will be described in detail below, a modification of handlebar support 51 in which swivelable joint 92 is replaced by a lockable joint, preferably is used when apparatus 50 is used to secure a pair of motorcycles.

The structure and function of upper J-hook 54, which is longitudinally slidably mounted to an upper end portion of upper cylindrical bar section 53 of handlebar support strut 51, may be best understood by referring to FIG. 16.

As shown in FIG. 16, upper J-hook 54 has a straight longitudinally disposed, inner leg 117 which protrudes radially outwards from an outer cylindrical wall surface 118 of cylindrical upper key lock 57, which in turn protrudes radially outwardly from the outer cylindrical wall surface 119 of a cylindrically-shaped sleeve 120 that is longitudinally slidably mounted on the outer cylindrical surface 121 of upper cylindrical bar section 53 of handlebar support strut 51. Straight inner leg 117 of J-hook 54 is disposed parallel to the longitudinal axis of upper cylindrical bar section 53 of handlebar support strut 51, and extends longitudinally outwards of outer transverse annular end wall 122 of sleeve 120, sufficiently far to also extend longitudinally outwards of outer transverse circular end wall 123 of the cylindrical bar section, even with the outer transverse end wall of the sleeve slid rearward or inwardly of the outer end of the cylindrical bar section, as shown in FIGS. 10 and 16.

As may be seen best by referring to FIG. 16, straight inner leg 117 of upper J-hook 54 is terminated by an arcuately curved U-shaped end portion 124 which curves radially inwardly, towards the longitudinal axis of upper cylindrical bar section 53, and rearwardly, the end portion having a generally straight, short outer leg 125 which is disposed parallel to a longitudinal center line of upper cylindrical bar section, on a side of the center line opposite to that of straight inner leg 117 of the upper J-hook. With this construction, curved end portion 124 of J-hook 54 has a concave, generally U-shaped opening 126 which confronts outer transversely disposed circular end wall 123 of upper cylindrical bar section 53.

As may be seen best by referring to FIGS. 8, 10 and 16, sleeve 120 has a central longitudinally disposed coaxial bore 127 which has an inner cylindrical wall surface 127A that is longitudinally slidable on outer cylindrical wall surface 121 of upper cylindrical bar section 53 of handlebar support strut 51. Preferably, sleeve 120 is prevented from rotating on upper cylindrical bar section 53 by providing a longitudinally disposed slot 128 in the outer cylindrical wall surface 121 of the upper cylindrical bar surface, and a guide pin 129 which protrudes radially inwardly into the slot from a radially disposed hole 130 through cylindrical wall 131 of sleeve 120.

As shown in FIGS. 8 and 16, outer cylindrical wall surface 121 of upper cylindrical bar section 53 is provided with a plurality of regularly spaced apart, blind indexing bores 132, which are adapted to insertably receive a locking pin 132A (see FIG. 23) that is advanceable radially inwardly into a selected bore by operating upper cylindrical key lock 57 with an appropriate key. This construction enables a vehicle structural member such as a handlebar to be engaged within U-shaped opening 126 of upper J-hook 54, between U-shaped end portion 124 of the J-hook and outer transverse circular end wall 123 of upper cylindrical bar section 53 of handlebar support strut 51.

In a preferred embodiment, to prevent marring a handlebar or other structural members engaged by J-hook 54, outer transverse circular end wall 123 of upper cylindrical bar section 53 is fitted with a resilient bumper stop 133. In one embodiment of handlebar support strut 51, shown in FIGS. 8, 10 and 16, bumper stop 133 comprises a bolt 134 which has an enlarged resilient head 135 and a threaded shank 136 which is threadingly received in a threaded blind bore 137 that extends longitudinally inward into outer circular face 123 of upper cylindrical section 53.

FIGS. 7 and 10 illustrate structural details of handlebar support strut 51 that enable lower cylindrical bar section 55 to be extended an adjustable distance outwards or below the lower transverse end 140 of central tubular section 52 of the handlebar support strut. As shown in FIGS. 7 and 10, a plurality of longitudinally regularly spaced apart, blind indexing bores 141 are formed in the outer cylindrical wall surface 142 of lower cylindrical bar section 55. As is also shown in FIGS. 7 and 10, intermediate cylindrical key lock 58 protrudes radially outwardly from outer cylindrical wall surface 143 of central tubular section 52, longitudinally inwards of lower transverse end 140 of the central tubular section. Intermediate key lock 58 has a locking pin 144 which is advanced radially inwardly through a perforation 145 through cylindrical wall 146 of central tubular section 52 when operated with a key, the pin being insertably received in a selected blind index bore 141 and thus maintaining a selected extension distance of lower cylindrical bar 55.

Figure 15:
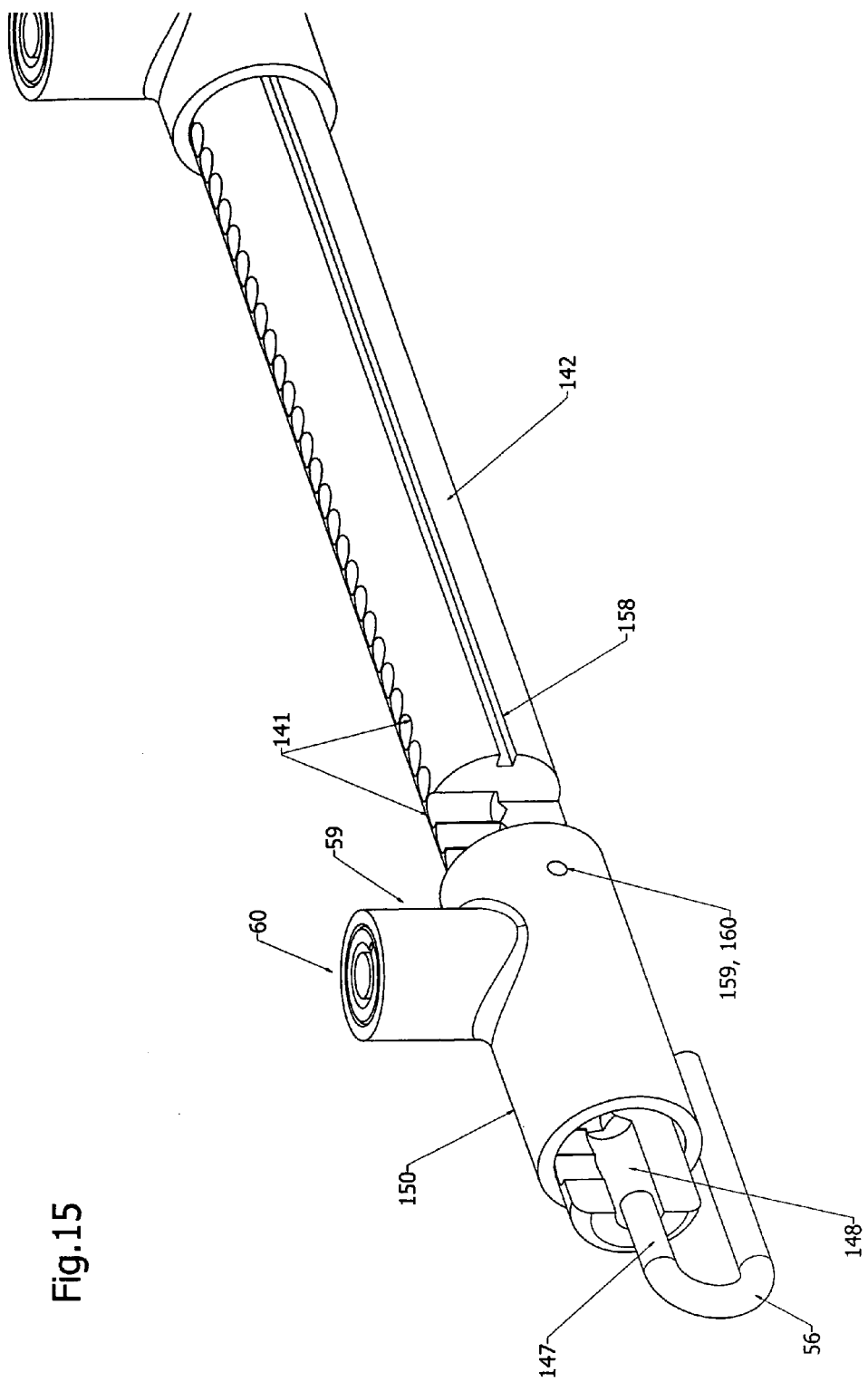
FIG. 15 is a fragmentary, partly sectional view of the handlebar strut of FIG. 10, showing details of a lower J-hook thereof.

FIGS. 7, 10 and 15 illustrate structural details of lower J-hook 56 of handlebar strut 51 and the manner of securing the J-hook through a perforation of an anchor member. As shown in those figures, lower cylindrical key lock 59 associated with lower J-hook 56 protrudes radially outwardly from the outer cylindrical wall surface 149 of a cylindrically-shaped, lower J-hook locking sleeve 150, which is longitudinally slidably mounted on the outer cylindrical surface 151 of lower cylindrical bar section 55 of handlebar support strut 51. Lower J-hook 56 has a straight, longitudinally disposed leg 147 which fits slidably in a central blind coaxial bore 148 in lower transverse end face 151 of lower cylindrical bar section 55. Straight inner leg 147 of lower J-hook 56 is terminated at a longitudinally outwardly located end thereof by an arcuately curved, U-shaped end portion 154 which curves rearwardly, the end portion having a generally straight leg 155 which is disposed parallel to and adjacent to outer cylindrical wall surface 151 of lower cylindrical bar section 55. With this construction, curved end portion 154 of lower J-hook 56 has a concave, generally U-shaped opening 156 which confronts outer circular end wall 153 of lower cylindrical bar section 55.

As shown in FIGS. 7-10, longitudinally disposed coaxial bore 148 of lower J-hook locking sleeve 150 has an inner cylindrical wall surface which is longitudinally slidable on outer cylindrical wall surface 142 of lower cylindrical bar 55 of handlebar strut 51. Preferably, sleeve 150 is prevented from rotating on lower cylindrical bar section 55 by providing a longitudinally disposed slot 158 in the outer cylindrical wall surface 142 of the lower cylindrical bar section, in combination with a guide pin 159 which protrudes radially inwardly into the slot from a radially disposed hole 160 through cylindrical wall 149 of sleeve 150.

As shown in FIGS. 7, 9 and 15, blind indexing bores 141 in the outer cylindrical wall surface 142 of lower cylindrical bar section 55, are adapted to insertably receive a locking pin 163 which is advanced radially inwardly into a selected bore by operating lower cylindrical key lock 59 with an appropriate key. This construction enables lower J-hook 56 to be inserted into a perforation through anchor member, and secured therein by sliding sleeve 150 inwardly on lower cylindrical bar section 55 to thereby slide inwardly disposed leg 147 of hook 56 into blind bore 148 in lower transverse end 153 of bar 55, and operating lower key lock 59.

As shown in FIGS. 1 and 7, handlebar support strut 51 of ATV/motorcycle lockdown apparatus 50 according to the present invention preferably includes at least one floating collar assembly 61 which is slidably mounted on lower cylindrical bar 55 of the handlebar strut. Optionally, floating collar assembly 61 may be slidably mounted on central tubular section 52 of handlebar strut 51, or as shown in FIGS. 1 and 7, an additional floating collar assembly 61A may be slidably mounted on central tubular member 52 of the handlebar strut. The quantity and location of floating collar assemblies 61 positioned on handlebar support strut 51 is selectable by a user of apparatus 50 as is appropriate for securing a particular ATV or motorcycle to a particular support anchor or transport vehicle.

Figure 13:
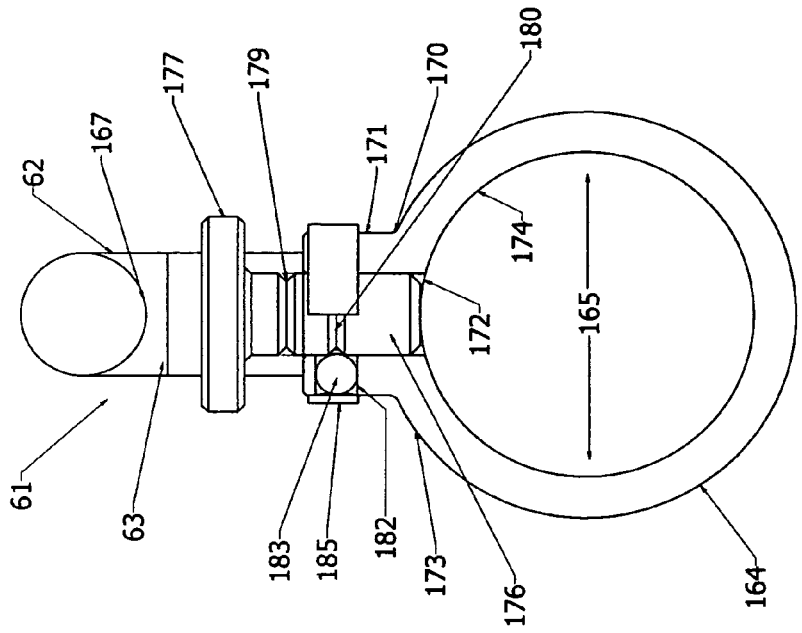
FIG. 13 is a fragmentary, partly sectional perspective view of the floating collar assembly of FIG. 10, on an enlarged scale.
Figure 14:
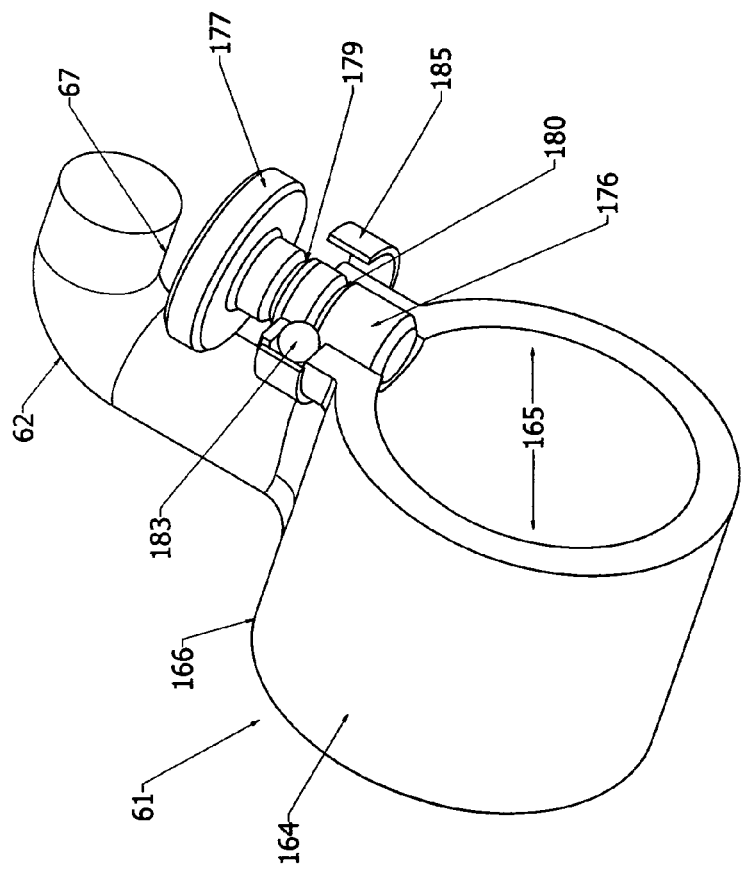
FIG. 14 is a transverse sectional view of the floating collar assembly of FIG. 13.

As may be seen best by referring to FIGS. 13, 14 and 16, floating collar assembly 61 includes a cylindrical sleeve 164 which has therethrough a central longitudinally disposed coaxial bore 165. Sleeve 164 has protruding radially outwardly from outer cylindrical wall surface 166 thereof an eye plate or link 62 which has therethrough a transversely disposed aperture or eye 63. As shown in FIG. 16, aperture 63 has a generally rectangular outline shape including an upper, radially outwardly located longitudinally disposed edge wall 167, inner and outer transversely disposed, longitudinally spaced apart edge walls 168, 169, and a lower, radially inwardly located longitudinally disposed edge wall 170 proximate outer cylindrical wall surface 166 of sleeve 164.

As may be seen best by referring to FIGS. 13 and 14, in addition to FIG. 16, inner longitudinally disposed edge wall 170 of floating collar assembly 61 has protruding radially outwardly therethrough, into eye 63, a hollow cylindrically-shaped, detent button boss 171. Detent button boss 171 has a central, radially disposed, coaxial bore 172 which penetrates upper longitudinally disposed wall 173 of the boss, and inner cylindrical wall surface 174 of sleeve 164, thus communicating with longitudinally disposed bore 165 through the sleeve. Radially disposed bore 172 through detent button boss 171 radially slidably receives therein a cylindrical locking pin 176 which has at an upper, radially outwardly located transverse end thereof a transversely disposed, circular finger knob 177. Cylindrical locking pin 176 also has formed in the outer cylindrical wall surface 178 thereof a pair of longitudinally spaced apart, annular ring-shaped outer and inner grooves 179, 180. Also, boss 171 has disposed transversely through cylindrical wall 181 thereof an aperture 182. Aperture 182 contains a steel detent ball 183, which is urged inwardly beyond the inner cylindrical wall surface 184 of the boss, into an outer or inner annular detent grooves 179, 180 of locking pin 176, by a C-shaped leaf spring 185.

With locking pin 176 retracted radially outwards as shown in FIGS. 13 and 14, and detent ball 183 urged resiliently into lower, inner annular detent groove 180, sleeve 164 of floating collar assembly 61 is longitudinally slidable on either lower cylindrical bar 55 or tubular central section 52 of handlebar support strut 51. When floating collar assembly 61 is adjusted to a desired longitudinal position on lower cylindrical bar 55 or tubular central section 52, finger knob 177 is pushed radially inward, thus extending inner radial end 186 of locking pin 176 into a selected blind indexing bore 141 in bar 55, or through a selected index hole 145 through wall 146 of central tubular section 52. Pushing finger knob radially inwards causes detent ball 183 to engage upper, outer detent groove 179, thus securing the floating collar assembly 61 at a selected longitudinal position.

FIGS. 9, 22 and 23 illustrate a modification of handlebar support strut 51 described above. As shown in FIGS. 9, 22 and 23, modified handlebar support strut 191 has a modified upper J-hook 194 in which the inner leg 197 thereof corresponding to inner straight leg 117 of J-hook 54 shown in FIG. 16, has in side elevation view a serpentine or S-shape, including a straight longitudinally inwardly located segment 198 disposed rearwardly from outer cylindrical wall surface 118 of cylindrical upper key lock 57, the rear leg segment being parallel and relatively close to a modified upper cylindrical bar 53A of the modified handlebar strut.

Inner leg 197 of modified upper J-hook 194 also has a relatively short serpentinely curved intermediate segment 199 which angles radially outwardly from an outer longitudinal end portion of straight rear segment 198, and a straight longitudinally outwardly located segment 200 which protrudes longitudinally outwards from the intermediate segment, parallel to but disposed radially outwardly from outer cylindrical wall surface 121A of modified upper cylindrical bar section 53A.

Outer straight segment 200 of modified J-hook 194 is disposed parallel to the longitudinal axis of upper cylindrical bar section 53A of modified handlebar support strut 191, and extends longitudinally outwards of outer transverse annular end wall 122 of sleeve 120 that supports upper key lock 57, sufficiently far to also extend longitudinally outwards of outer transverse circular end wall 123A of the upper cylindrical bar section, even with the outer transverse end wall of the sleeve positioned rearwardly or inwardly of the outer end of the cylindrical bar segment as shown in FIGS. 9, 22 and 23.

As may be seen best by referring to FIG. 23, outer straight leg segment 200 of modified upper J-hook 194 is terminated by an arcuately curved U-shaped end portion 204 which curves radially inwardly towards the longitudinal axis of upper cylindrical bar section 53A, and rearwardly, the end portion having a generally straight, short outer leg 205 which is coaxially aligned with the longitudinal center line of the upper cylindrical bar section. As shown in FIG. 23, circular transverse end wall 123A of upper cylindrical bar section 53A has formed therein a coaxial blind bore 206 of a suitable diameter to insertably receive longitudinally inwardly directed leg 205 of modified upper J-hook, thus securing a handlebar or other structural member within U-shaped opening 206 of the J-hook, when sleeve 120 is slid longitudinally inwardly and upper key lock 57 operated The structure and function of cross-lock arm 71 may be best understood by referring to FIGS. 7, 19 and 20. As shown in those figures, and described briefly above, cross-lock arm 71 includes an elongated, straight tubular section 72 which has protruding longitudinally from an outer cylindrical wall surface 77 thereof, proximate a first transverse end 211 thereof, a fixed C-shaped hook 74. Fixed hook 74 has front and rear parallel, longitudinally disposed sides 212, 213, which are spaced equidistant from a longitudinal center plane through tubular section 72 of cross-lock arm 71. Fixed hook 74 includes a short, straight, longitudinally inwardly located section 214 which is secured to outer cylindrical wall surface 216 of tubular section 72, as for example, by a welded joint. Hook 74 also has extending longitudinally from straight section 214 thereof an arcuately curved outer section 215 which has a generally transversely oriented concave opening 216 and an outer tang 217. Although the exact construction of hook 74 is not critical, a suitable construction, shown in FIG. 7, utilizes a length of arcuately bent steel bar stock.

Referring still to FIGS. 7, 19 and 20, it may be seen that cylindrical bar section 75 of cross-lock arm 71 is telescopically adjustable within central coaxial bore 73 disposed longitudinally through tubular section 72, and locked at a selected longitudinal extension distance from transverse end wall 78 of the tubular section, by cross-lock arm key lock 76, utilizing a construction exactly similar in structure and function to that of lower cylindrical bar section 55 and tubular central section 52 of handlebar upper strut 51, as described above. Also, swivel joint 80, which joins a transverse end 219 of lower cylindrical bar section 75 to swivelable C-hook 79, is exactly similar in structure and function to swivel 92 of handlebar support strut 51, as described above.

Figure 26:
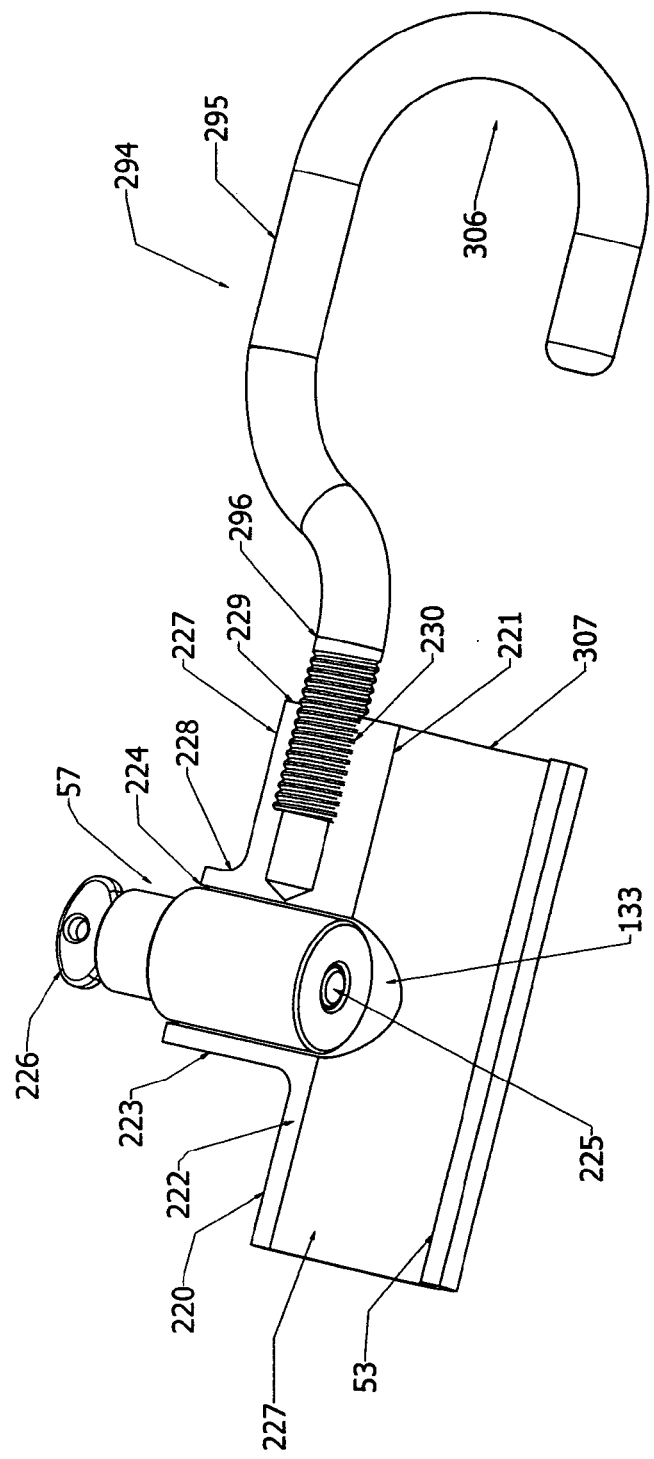
FIG. 26 is a fragmentary, partly sectional view of a further modification of the modified J-hook of FIG. 23.

FIG. 26 illustrates a further modification of J-hook 194 of modified handlebar strut 191, as shown in FIGS. 9, 22 and 23, and described above. As shown in FIG. 26, modified J-hook 294 includes a sleeve 220 which has a central coaxial bore 227 that slidably receives upper cylindrical bar section 53 of handlebar strut 191. Sleeve 220 has a generally cylindrically-shaped, longitudinally disposed tubular section 222, and a hollow outer key lock cylinder 223 which protrudes radially outwardly from outer wall surface 224 of the tubular section. Radially disposed cylinder 223 of sleeve 220 has disposed therethrough a coaxial bore 224 in which is fitted cylindrical key lock 57. Key lock 57 has a locking pin 225 that is advanceable, by turning a key 226, into a selected blind bore 133 in outer cylindrical wall surface 121 of cylindrical bar 53.

As shown in FIG. 26, sleeve 220 of modified J-hook 294 also has a longitudinally disposed cylindrical boss 227 which protrudes perpendicularly from outer cylindrical wall surface 228 of key lock cylinder 223 and which is disposed parallel to bore 227 of sleeve 220. Longitudinally disposed boss 227 has a transversely disposed end face 229 which is penetrated by a blind, threaded bore 230 that is disposed parallel to the longitudinal axis of sleeve 220 and bar 53. Threaded bore 230 threadingly receives an externally threaded straight inner leg 296 of J-hook 295, thus enabling the extension of inner opening 306 of the J-hook relative to transverse end 307 of sleeve 220, and therefore relative to the transverse end of bar 53, to be adjusted by threadingly advancing inner leg 296 within bore 230.

FIG. 27 illustrates a modification of handlebar strut 51 shown in FIGS. 8-10 and described above. Modified handlebar strut 51B uses a modified upper tubular section 52B, in which floating collar assemblies 61 are replaced by a longitudinally disposed central eye plate 62V which has through its thickness dimension a plurality of longitudinally spaced apart perforations 63V. Perforations 63V serve as selectable anchor points for hook 74 of a cross arm 71, as shown in FIGS. 1 and 2 and described above.

FIGS. 28 and 29 illustrate another modification of handlebar strut 51, in which the upper swivelable joint 92 thereof is replaced by an adjustable length joint 292 which may optionally be locked to prevent flexural motion of upper cylindrical bar section 53C of the strut relative to intermediate tubular section 52C of the strut.

As shown in FIGS. 28 and 29, modified handlebar strut 51C has an upper swivelable joint 292 which connects an upper end of an intermediate tubular section 52C to an upper central bar section 53C of the strut. Joint 292 is similar in construction and function to swivelable joint 92 which connects intermediate tubular section 52 and upper bar section 53 of the basic embodiment 51 of a handlebar strut, as illustrated in FIG. 17 and described above. However, as shown in FIGS. 28 and 29, a longitudinally disposed end portion 53E of cylindrical bar section 53C is provided with external helical threads 53F which are disposed axially inwardly from lower transverse end face 314 of the cylindrical bar section. A cylindrically-shaped collar 315 which has internal helical threads 316 fits threadingly over end portion 53E of cylindrical bar section 53C. With the outer transverse edge wall 317 of collar 315 threadingly retracted from transverse end wall 314 of tubular intermediate section 52C of strut 51C, upper cylindrical section 53C may be locked or unlocked relative to the tubular intermediate section by rotating the collar 315 about the axis of an Allen bolt 304 which threadingly joins the upper and intermediate sections of the strut. When upper cylindrical bar section 53C has been adjusted to a desired extension length relative to intermediate tubular section 52C, collar 315 is threadingly advanced towards the central tubular section until outer (lower) transverse end wall 317 of the collar abuts outer (upper) transverse end wall 314 of the central tubular section. With joint 292 thus configured, central tubular section 52C and upper cylindrical section 53C of strut 51C are axially aligned and locked against relative motion therebetween.

FIGS. 30-32 illustrate a modification of cross-lock arm 71 shown in FIGS. 7, 19, 20 and described above. A modified cross-lock arm 71C shown in FIGS. 30-32 is useful for securing a pair of motorcycles in a laterally spaced apart arrangement, as shown in FIG. 6.

Referring to FIGS. 30-32, it may be seen that modified cross-lock arm 71C includes an elongated hollow cylindrical tube 72C which telescopically slidably receives within bore 73C thereof an elongated cylindrical bar section 75C. Cylindrical bar section 75C is telescopically extendible a selectable distance from tubular section 72C of cross-lock arm 71C, and fixed at that distance by a cylindrical key lock 76C, which protrudes radially outwards from an outer cylindrical wall surface 77C of the tubular section, near lower transverse end 78C thereof.

As shown in FIGS. 30 and 31, cross-lock arm 71C includes a U-bolt clamp assembly 79C which is attached to lower transverse end 318 of cylindrical bar section 75. U-bolt clamp assembly 79C includes a saddle 319 which has a flat rectangular base 320 that is fastened concentrically to lower transverse end 318 of the cylindrical bar section. Saddle 319 has an outer transverse wall 321 in which is formed a generally semi-circularly-shaped longitudinally inwardly disposed concave notch 322 that is positioned midway between a pair of rectangularly-shaped side walls 323L, 323R which protrude perpendicularly outwards from base 320.

Base 320 of U-bolt clamp 79C has disposed perpendicularly through its thickness dimension a pair of laterally spaced apart longitudinally disposed bores 324, 325 located short equal distances inwardly from side walls 323L, 323R, respectively. Bores 325, 324 receive the threaded and smooth, longitudinally disposed shanks 326, 327, respectively, of a U-bolt 328. Bore 324 for smooth U-bolt shank 327 preferably has a key-hole shaped extension 329 which protrudes radially outwardly from the inner circumferential wall surface 330 of the bore. Smooth shank 327 of U-bolt 328 is provided with a locking pin 331 which protrudes outwardly from outer cylindrical wall surface 332 of the shank, near outer transverse end 333 of the shank. Thus constructed, smooth shank is insertable into bore 324 of saddle 319, with pin 331 aligned in parallel with key hole extension 329, and prevented from withdrawal from the bore with the shank rotated 90 degrees, as shown in FIG. 31.

As shown in FIG. 31, U-bolt clamp assembly 79C has a generally circular or oval-shaped opening 334 formed between saddle notch 322 and a generally semi-circularly-shaped inner wall 335 of U-bolt 328. Opening 334 is of an appropriate size and shape to receive therethrough either of the left and right front fork tubes FTL, FTR of a motorcycle, as shown in FIG. 6, whereupon U-bolt clamp assembly 79C is secured to the fork tube by tightening a wing nut 336 on a threaded portion 326 of U-bolt shank which protrudes through bore 325.

As shown in FIGS. 30 and 32, cross-lock arm 71C also includes a U-bolt clamp assembly 74C which is attached to outer transverse end 338 of tube 72C of the cross-lock arm. U-bolt clamp assembly 74C is identical in structure and function to U-bolt clamp assembly 79C.

FIGS. 33 and 34 illustrate a handlebar locking arm 340 for use with the lockdown apparatus of FIG. 1. The purpose of handlebar locking arm 340 s to provide anchor eyes 341, 342 for engagement by J-hooks 54 of handlebar support struts 51, when apparatus 50 is used to lockdown a street-type motorcycle which has short, downwardly angled handlebars which would not otherwise be readily engageable by J-hooks 54, as may be understood by referring to FIG. 35.

As shown in FIG. 33, handlebar locking arm 340 includes an L-shaped, circular cross-section hollow tubular beam 343 which has an upwardly disposed upright leg 344 and a longer, laterally inwardly disposed leg 345 which protrudes perpendicular inwardly from an upper elbow-shaped transition section 346 located at an upper end portion of the upwardly disposed leg.

As is also shown in FIG. 33, handlebar locking arm 340 also has an L-shaped, circular cross-section cylindrical bar 353 which has a shape that is symmetrical to that of tubular beam 343. Thus, bar 353 includes an upwardly disposed upright leg 354 and a longer, laterally inwardly disposed leg 355 which protrudes perpendicularly inwardly from an upper elbow-shaped transaction section 356 located at an upper end portion of the upwardly disposed leg. Lateral leg 355 of bar 353 is telescopically received within a coaxial bore 357 disposed laterally through leg 345 from inner transverse end wall 358 of the straight tubular leg. Leg 355 of bar 353 is secured at an adjustable extension length from straight tubular leg 345 by a pin 359 advanced into a selected one of a plurality of longitudinally spaced apart blind bores 360 which are formed in the outer cylindrical wall surface 361 of leg 355, the pin being advanced by inserting a key into and turning the cylinder 362 of cylindrical lock 363 which protrudes radially outwards from outer cylindrical wall surface 364 of tubular lateral leg 345.

As shown in FIGS. 33 and 34, handlebar locking arm 340 includes a pair of tubular-shaped handlebar receiver cups 365L, 365R fastened to lower ends 367, 368 of upright tubular leg 344 and upright bar leg 354, respectively. Tubular handlebar receiver cups 365L, 365R may be identical in structure and function, and include a longitudinally elongated, hollow cylindrical tube section 369 which has disposed longitudinally through its length a coaxial cylindrical bore 370. Bore 370 is of the proper size to insertably receive in an opening 371 in an inner transverse end wall 372 thereof the handgrip end of a motorcycle handlebar. Tube section 369 of handlebar receiver cup 365 has located at a longitudinal end thereof opposite to that of inner transverse annular end wall 372 a circular disk-shaped outer end wall 373. Outer end-wall 373 has protruding perpendicularly outwards from outer surface 374 thereof a U-shaped eye bolt 375. Eye bolt 375 has a pair of parallel, radially apart legs 376, 377, which join an arc-shaped outer section 378, forming an oval-shaped eye 379 between end-wall outer surface 374 and arc-shaped portion 378.

As shown in FIGS. 33 and 34, each handlebar receiver cup 365 includes a hollow, cylindrically-shaped boss 380 which protrudes radially outwardly from outer cylindrical wall surface 381 of tubular section 369. As shown in the Figures, boss 380 is positioned midway between inner transverse annular end wall 372 and outer transverse wall 373 of tubular handlebar receptacle cup section 369.

Boss 380 functions as a component of a swivelable joint 392 which swivelably joins handlebar receiver cups 365L, 365R to left and right uprights 343, 353 of handlebar locking arm 340. In a preferred embodiment, swivelable joins 392 are similar in construction and function to swivelable joint 92 shown in FIG. 11 and described above.

Figure 35:
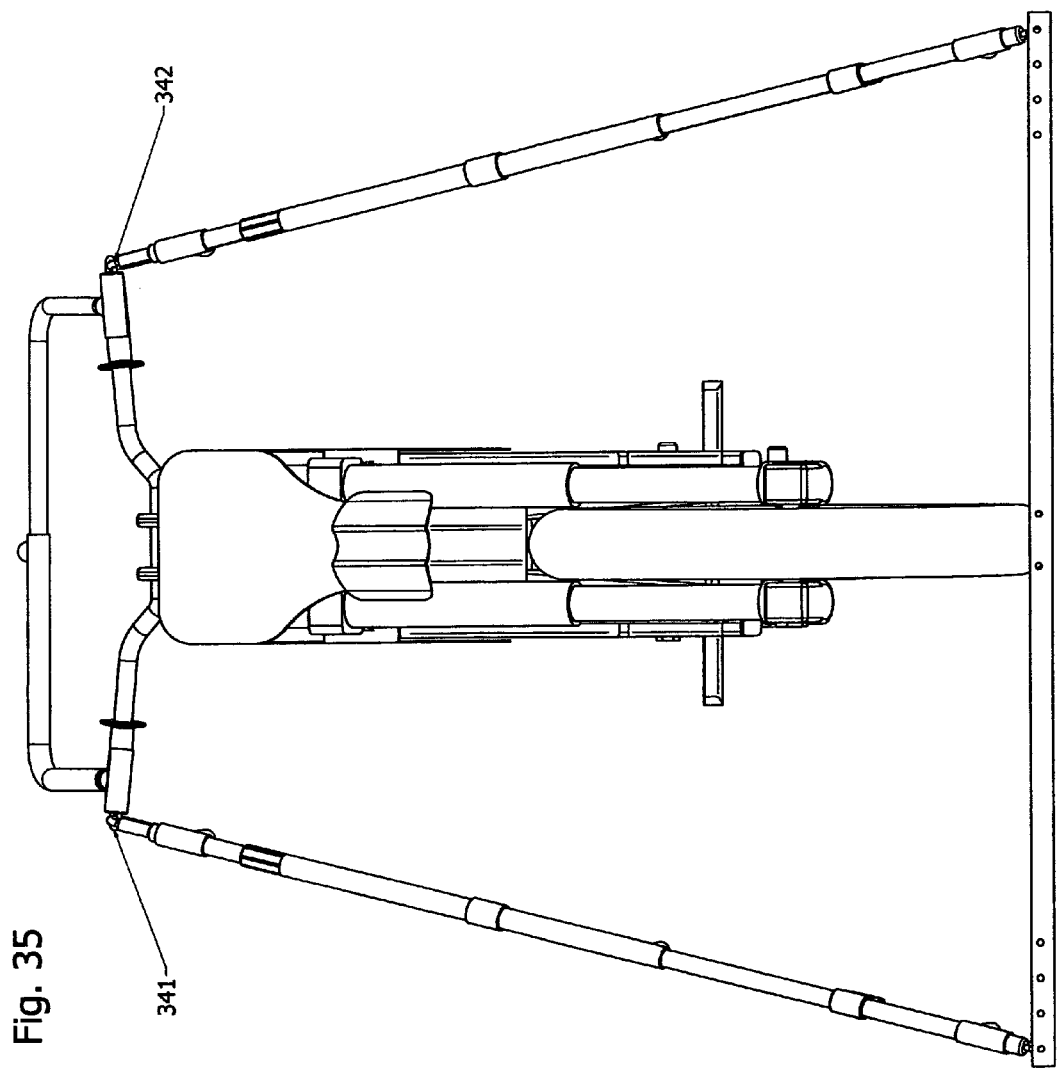
FIG. 35 is a front perspective view showing the handlebar locking arm of FIG. 33 and a pair of handlebar struts in use to secure a street motorcycle.

FIG. 35 illustrates the manner of using handlebar locking arm 340, in which left and right handlebar grips 74L and 74R are inserted into inner openings 371L, 371R of left and right handlebar receiver cups 365L and 365R, respectively. Tubular beam 343 and bar 353 are then telescopically collapsed relative to one another to decrease lateral opening between left and right handlebar receiver cups 365L and 365R, and key lock 363 operated to secure the uprights 344 and 354 at a lateral spacing which secures handlebar cups HR and HL with their respective handlebar receiver cups. J-hooks 54 of a pair of handlebar support struts 51 are then hooked into openings 379L and 379R of eye bolts 375L and 375R, and the struts secured to an anchor member as shown in FIGS. 1 and 34.

What is claimed is:

1. An apparatus (50) for securing in an upright position on a support surface at least a first personal transport vehicle (A), said apparatus comprising;
   a. at least a first elongated strut (51) having at a first, upper end thereof a first attachment assembly (54) for releasable attachment to a first structural member of a first personal transport vehicle (A), and at a second, lower end thereof a second attachment assembly (56) for releasable attachment to an anchor structure, and
   b. at least a first elongated cross-lock arm (71) having at first and second ends thereof first (74) and second (79) attachment assemblies releasably attachable alternatively between said strut and a second structural member of said first personal transport vehicle (A) (FIG. 1), and between a structural member of a first personal transport vehicle (A1) (FIG. 6) and a structural member of a second personal transport vehicle (A2) (FIG. 6).

2. The apparatus of claim 1 wherein said strut is further defined as including a telescopic adjustment mechanism which enables adjustment of a span length between said first and second ends of said strut.

3. The apparatus of claim 2 wherein said strut is further defined as including a strut length-adjustment lock to secure said span length between said first and second ends of said strut.

4. The apparatus of claim 1 wherein said strut is further defined as including a strut upper attachment lock for securing an upper attachment assembly of said strut to a structural member of a vehicle.

5. The apparatus of claim 1 wherein said first attachment assembly at said first, upper end of said strut is further defined as including a first, upper hook hookable onto a structural member of a vehicle.

6. The apparatus of claim 1 wherein a second, lower attachment assembly at said lower end of said strut is further defined as including a hook attachable to a part of an anchor structure.

7. The apparatus of claim 1 wherein said strut is further defined as including a strut lower attachment lock for securing said second attachment assembly thereof to an anchor structure.

8. The apparatus of claim 1 wherein said strut is further defined as including an intermediate attachment structure located between said first and second ends of said strut, said intermediate attachment structure being adapted to engage one of said first and second cross-lock arm attachment assemblies.

9. The apparatus of claim 1 wherein said cross-lock arm is further defined as including a telescopic adjustment mechanism which enables adjustment of a span length between said first and second ends of said arm.

10. The apparatus of claim 9 wherein said cross-lock arm is further defined as including a cross-lock arm lock to secure said span length between said first and second ends of said cross-lock arm.

11. The apparatus of claim 1 wherein said first attachment assembly at said first end of said cross-lock arm is further defined as including a first hook hookable onto a component of a vehicle to be supported.

12. The apparatus of claim 11 wherein said first hook is further defined as being swivelably attached to an end of a longitudinally elongated beam portion of said cross-lock arm.

13. The apparatus of claim 1 wherein said first attachment assembly at said first upper end of said strut is further defined as being swivelably adjustable with respect to an elongated beam portion of said strut.

14. The apparatus of claim 13 wherein said strut is further defined as including a locking mechanism for immobilizing said swivelable adjustment.

15. The apparatus of claim 1 further including a second strut.

16. The apparatus of claim 15 further including a second cross-lock arm.

* * * * *